US011312494B2

(12) United States Patent
O'Neill et al.

(10) Patent No.: US 11,312,494 B2
(45) Date of Patent: Apr. 26, 2022

(54) VEHICULAR SEATING SUITE CONFIGURATION

(71) Applicant: Zephyr Aerospace, LLC, San Francisco, CA (US)

(72) Inventors: Jeffrey O'Neill, San Francisco, CA (US); Victor Dominique Carlioz, Manhattan Beach, CA (US); Matthew Cleary, Manhattan Beach, CA (US)

(73) Assignee: ZEPHYR AEROSPACE, LLC, San Francisco, CA (US)

( * ) Notice: Subject to any disclaimer, the term of this patent is extended or adjusted under 35 U.S.C. 154(b) by 439 days.

(21) Appl. No.: 16/374,376

(22) Filed: Apr. 3, 2019

(65) Prior Publication Data

US 2019/0308733 A1  Oct. 10, 2019

Related U.S. Application Data

(60) Provisional application No. 62/652,836, filed on Apr. 4, 2018.

(51) Int. Cl.
*B64D 11/06* (2006.01)

(52) U.S. Cl.
CPC ...... *B64D 11/0604* (2014.12); *B64D 11/0601* (2014.12); *B64D 11/0606* (2014.12)

(58) Field of Classification Search
CPC .. B64D 11/0601; B64D 11/0604; B60N 2/01; B60N 2/24
See application file for complete search history.

(56) References Cited

U.S. PATENT DOCUMENTS

| D148,691 S | 2/1948 | Graef |
| D148,740 S | 2/1948 | Allen |
| D202,980 S | 11/1965 | Carson |
| D226,464 S | 3/1973 | Genaro et al. |
| D245,706 S | 9/1977 | McAllister |

(Continued)

FOREIGN PATENT DOCUMENTS

| WO | 2009079668 A2 | 6/2009 |
| WO | 2011077364 A1 | 6/2011 |

OTHER PUBLICATIONS

Non-Final Office Action issued in related U.S. Appl. No. 29/686,315 dated Sep. 23, 2020.

(Continued)

*Primary Examiner* — Joshua J Michener
*Assistant Examiner* — Arfan Y. Sinaki
(74) *Attorney, Agent, or Firm* — Shumaker, Loop & Kendrick LLP

(57) ABSTRACT

A vehicular seating suite configuration may include a plurality of vertically stacked seating suites configured to be positioned within a vehicle. Each seating suite may include an elongated generally horizontal seating surface angled away from a longitudinal axis of a vehicle and a generally vertical backrest portion adjacent to a proximal end of the elongated generally horizontal seating surface. The elongated generally horizontal seating surface and the generally vertical backrest portion may be configured to accommodate a person in a sitting position and the elongated generally horizontal seating surface may be configured to accommodate a person in a lying position.

15 Claims, 29 Drawing Sheets

(56) References Cited

U.S. PATENT DOCUMENTS

| | | | | |
|---|---|---|---|---|
| 4,854,245 | A | * | 8/1989 | Platzer ..................... B60P 3/36 |
| | | | | 105/317 |
| 5,716,026 | A | * | 2/1998 | Pascasio ................ B64D 11/00 |
| | | | | 105/315 |
| D423,825 | S | | 5/2000 | Alcala et al. |
| 6,056,239 | A | * | 5/2000 | Cantu .................... B64D 11/06 |
| | | | | 244/118.5 |
| 6,237,872 | B1 | | 5/2001 | Bar-Levav |
| D558,993 | S | | 1/2008 | Saint-Jalmes et al. |
| D615,476 | S | | 5/2010 | Bock |
| D617,725 | S | | 6/2010 | Collins et al. |
| D696,033 | S | | 12/2013 | Ersan et al. |
| D696,524 | S | | 12/2013 | Ersan et al. |
| D718,945 | S | | 12/2014 | Nicholas et al. |
| D720,160 | S | | 12/2014 | Lloyd et al. |
| D727,042 | S | | 4/2015 | Wagner et al. |
| D733,442 | S | | 7/2015 | Dryburgh et al. |
| D765,999 | S | | 9/2016 | Goode et al. |
| D768,400 | S | | 10/2016 | Berry et al. |
| D780,938 | S | | 3/2017 | McGrath et al. |
| D790,239 | S | | 6/2017 | Goode et al. |
| D792,130 | S | | 7/2017 | Poranen |
| D806,416 | S | | 1/2018 | Katakura et al. |
| D806,417 | S | | 1/2018 | Katakura et al. |
| 9,856,025 | B2 | | 1/2018 | Jasny et al. |
| D809,811 | S | | 2/2018 | Moyes et al. |
| 9,919,800 | B2 | | 3/2018 | Cailleteau et al. |
| D824,183 | S | | 7/2018 | Bryant |
| D830,712 | S | | 10/2018 | Goode et al. |
| D856,692 | S | | 8/2019 | Veneruso |
| D885,774 | S | | 6/2020 | Bonneywell |
| D893,931 | S | | 8/2020 | Katakura et al. |
| 10,909,397 | B2 | * | 2/2021 | Behr ....................... H04N 7/181 |
| 2010/0065683 | A1 | | 3/2010 | Darbyshire |
| 2011/0011977 | A1 | | 1/2011 | Olliges |
| 2012/0104165 | A1 | | 5/2012 | Dobrusin et al. |
| 2012/0193167 | A1 | * | 8/2012 | Winter, IV ............. E06C 1/125 |
| | | | | 182/78 |
| 2014/0035330 | A1 | | 2/2014 | Henshaw |
| 2014/0197667 | A1 | * | 7/2014 | Cheung .................. B64D 11/00 |
| | | | | 297/257 |
| 2015/0001341 | A1 | * | 1/2015 | Ersan .................. B64D 11/0601 |
| | | | | 244/118.6 |
| 2015/0166182 | A1 | * | 6/2015 | Ducreux ............ B64D 11/0601 |
| | | | | 244/118.6 |
| 2015/0274298 | A1 | * | 10/2015 | Kircher .............. B64D 11/0604 |
| | | | | 244/118.6 |
| 2015/0298812 | A1 | * | 10/2015 | Jasny ..................... B60N 2/002 |
| | | | | 244/118.6 |
| 2016/0194084 | A1 | | 7/2016 | Rajasingham |
| 2016/0272323 | A1 | | 9/2016 | Carlioz et al. |
| 2018/0056846 | A1 | * | 3/2018 | Nasiri ....................... B60P 3/39 |
| 2019/0308733 | A1 | | 10/2019 | O'Neill et al. |
| 2020/0070691 | A1 | | 3/2020 | Glain et al. |
| 2020/0238880 | A1 | | 7/2020 | Valdes De La Garza et al. |

OTHER PUBLICATIONS

Notice of Allowance issued in related U.S. Appl. No. 29/686,313 dated Oct. 1, 2020.

Ex-Parte Quayle Action issued in related U.S. Appl. No. 29/686,311 on Sep. 28, 2020.

"Delta Gets Comfy with Full Flat-Bed Seats", Apr. 22, 2014, travelpulse.com sited visited Sep. 16, 2020 <https://www.travelpulse.com/news/airlines/delta-gets-comfy-with-fiat-bed-seats.html> (Year: 2014), 1 page.

Salton, J. "The Flex-Seat Offers Even Economy Class Fliers the chance of a good night's sleep", Dec. 8, 2009, newatlas.com site visited Sep. 16, 2020, <https:/newatlas.com/airline-seating-innovation/13535/> (Year: 2009), 1 page.

Notice of Allowance issued in related U.S. Appl. No. 29/686,315 dated Dec. 10, 2020.

Notice of Allowance issued in related U.S. Appl. No. 29/686,311 dated Dec. 24, 2020.

International Search Report issued in related PCT Application Serial No. PCT/US2019/025541 dated Jun. 21, 2019.

International Search Report issued in PCT Application Serial No. PCT/US2019/025541 dated Jun. 21, 2019.

European Patent Office; Communication cited in EP Patent Application No. 19782167.1, dated Dec. 13, 2021; 7 pages.

* cited by examiner

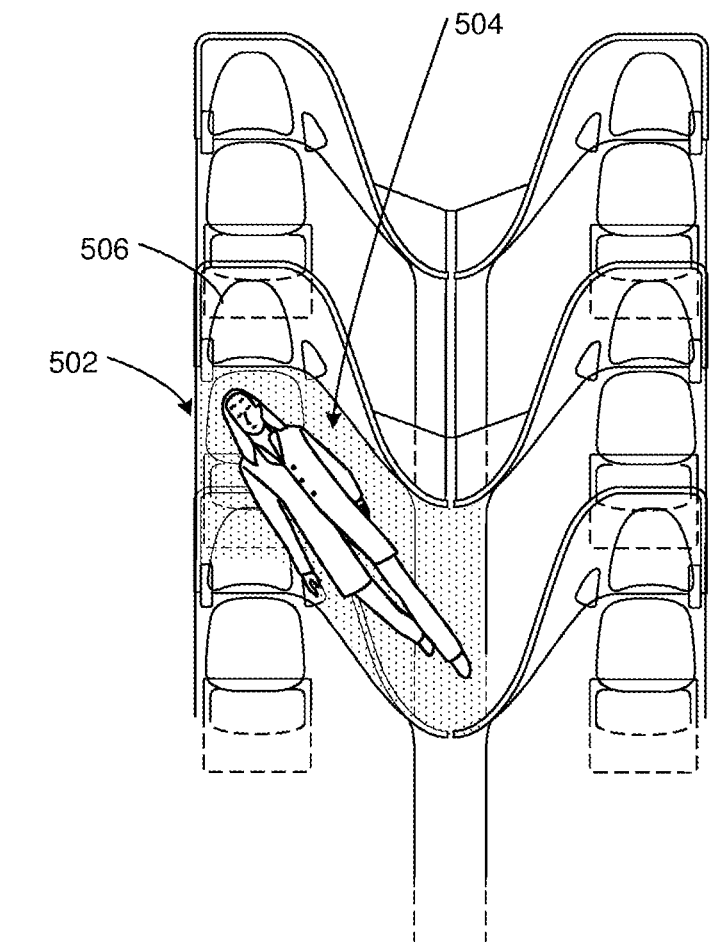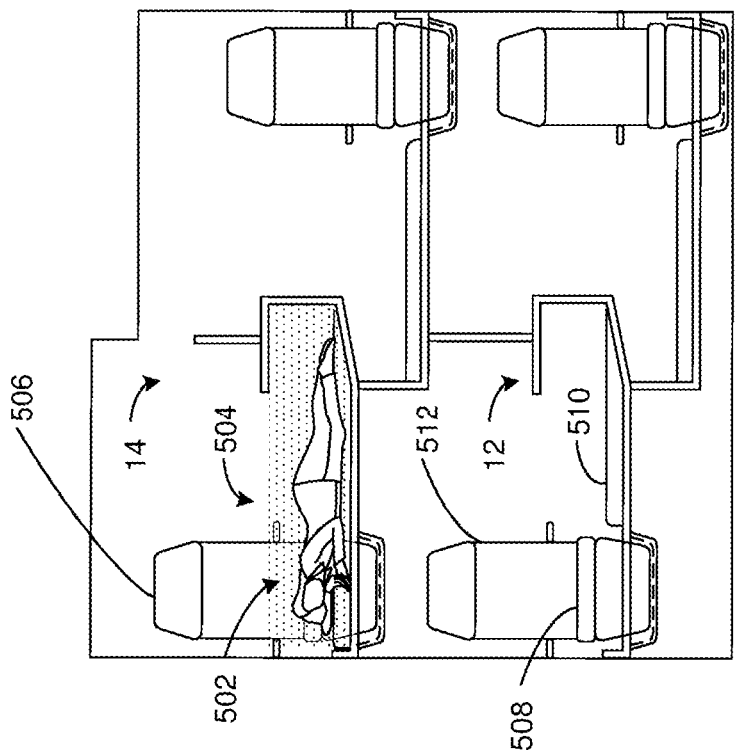
FIG. 6

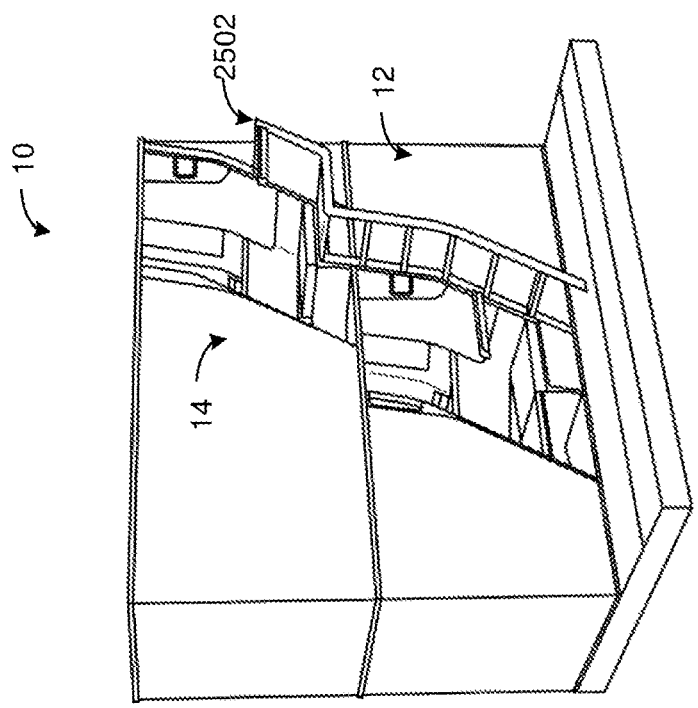
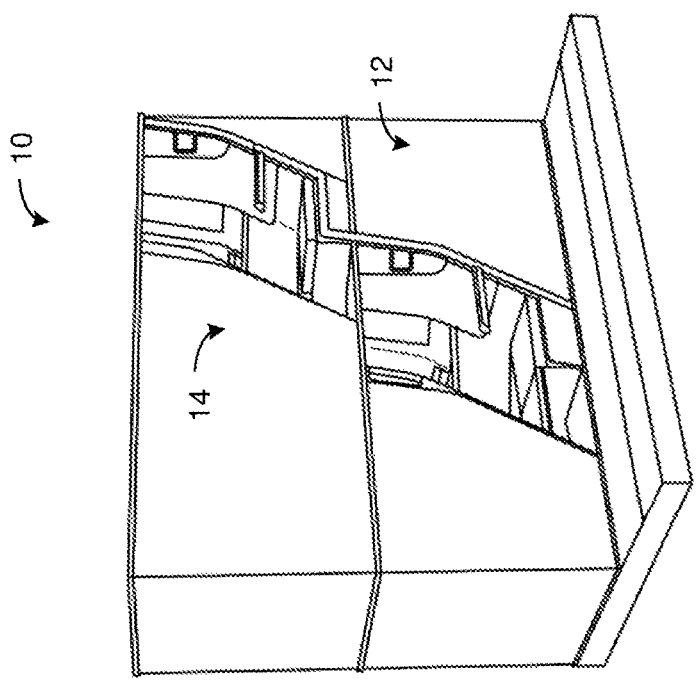
FIG. 25

VEHICULAR SEATING SUITE CONFIGURATION

CROSS-REFERENCE TO RELATED APPLICATION

This application claims the benefit of U.S. Provisional Application No. 62/652,836, filed on 4 Apr. 2018, the contents of which is incorporated by reference.

TECHNICAL FIELD

The present disclosure generally relates to vehicular seating suite configurations and more particularly to vertically stacked seating suites in a vehicle.

BACKGROUND

More individuals are traveling further than ever before. Long trips, either by aircraft, boat, train, bus, car, etc., often extend overnight making travel uncomfortable. For example, many passengers are unable to sleep in the limited recline of a chair. While many premium seating options provide motorized reclining seats and private cabins for passengers, these seating options provide poor seating density in a vehicle and/or a significant expense for vehicle operators. Additionally, safety regulations associated with most commercial travel limit vehicle operators from providing more comfortable seating options.

SUMMARY

In an embodiment, a vehicular seating suite configuration may include a plurality of vertically stacked seating suites configured to be positioned within a vehicle. Each seating suite may include an elongated generally horizontal seating surface and a generally vertical backrest portion adjacent to a proximal end of the elongated generally horizontal seating surface. The elongated generally horizontal seating surface and the generally vertical backrest portion may be configured to accommodate a person in a sitting position and the elongated generally horizontal seating surface may be configured to accommodate a person in a lying position.

One or more of the following features may be included. The elongated generally horizontal seating surface may be angled away from a longitudinal axis of a vehicle. A ladder may be disposed between a lower seating suite and an upper seating suite. At least one storage compartment may be disposed beneath at least a portion of a lower seating suite. A tray table may be disposed adjacent to the proximal end of the elongated generally horizontal seating surface. Each seating suite may be at least partially enclosed. The generally vertical backrest portion may be aligned with the longitudinal axis of the vehicle.

According to another implementation, a vehicular seating suite configuration may include a plurality of vertically stacked seating suites configured to be positioned within a vehicle. Each seating suite may include a generally horizontal seating portion aligned with a longitudinal axis of a vehicle and a generally horizontal bed portion adjacent to the seating portion and angled away from the longitudinal axis of the vehicle.

One or more of the following features may be included. A generally vertical backrest portion may be disposed adjacent to a proximal end of the generally horizontal seating portion. A ladder may be disposed between a lower seating suite and an upper seating suite. At least one storage compartment may be disposed beneath at least a portion of a lower seating suite. A tray table may be disposed adjacent to the generally horizontal seating portion. Each seating suite may be at least partially enclosed. A distal end of at least one bed portion of the plurality of seating suites of a first vehicular seating suite configuration may be configured to at least partially overlap a distal end of at least one adjacent bed portion of a plurality of seating suites of a second vehicular seating suite configuration. Each seating suite may include a footwell adjacent to the generally horizontal seating portion and a removable footwell cover adjacent to the footwell. The removable footwell cover may be configured to provide a continuous surface from the generally horizontal seating portion and the generally horizontal bed portion across the footwell. The generally horizontal seating portion may include a seat pan and a leg rest coupled to the seat pan. The seat pan and the leg rest may be configured to provide a continuous surface across the seat pan, the leg rest, and the generally horizontal bed portion. An upper seating suite may be horizontally offset from the lower seating suite along the longitudinal axis of the vehicle.

According to yet another implementation, a vehicular seating suite configuration may include a plurality of vertically stacked seating suites configured to be positioned within a vehicle. Each seating suite may include an elongated generally horizontal seating surface angled away from a longitudinal axis of a vehicle and a generally vertical backrest portion adjacent to a proximal end of the elongated generally horizontal seating surface. The elongated generally horizontal seating surface and the generally vertical backrest portion may be configured to accommodate a person in a sitting position, and the elongated generally horizontal seating surface may be configured to accommodate a person in a lying position. The vehicular seating suite configuration may also include a telescopic ladder integrated into a lower seating suite and configured to provide access to an upper seating suite.

One or more of the following features may be included. The telescopic ladder may include a support mechanism that provides an armrest adjacent to the generally vertical backrest portion of the upper seating suite when the telescopic ladder is retracted into the lower seating suite.

BRIEF DESCRIPTION OF THE DRAWINGS

FIG. 6 is a front view and a top plan view of a vehicular seating suite configuration, according to an example embodiment;

FIGS. 25-28 are various perspective views of a vehicular seating suite configuration, according to an example embodiment.

DETAILED DESCRIPTION OF EXAMPLE EMBODIMENTS

In general, consistent with the present disclosure, a vehicular seating suite configuration comprising vertically stacked seating suites is provided to accommodate passengers both in a seating position and a lying position. For example, the vehicular seating suite configuration may include an upper seating suite and a lower seating suite within the vehicle. Each seating suite may include an elongated generally horizontal seating surface and a generally vertical backrest portion, where the combination of the elongated generally horizontal seating surface and the generally vertical backrest portion may be configured to accommodate a person in a seating position, while the elongated generally horizontal seating surface may be configured to accommodate a person in a lying position. For example, when a person or passenger of a vehicle desires to be in a sitting position, the person may rest their back against the generally vertical backrest portion while sitting on the elongated generally horizontal seating surface with or without their legs extending out on the elongated generally horizontal seating surface. When a person desires to move to a lying posture position, the person may slide their head and back down the generally vertical backrest portion on the elongated generally horizontal seating surface until they are generally in a lying position on the elongated generally horizontal seating surface. In this manner, the vehicular seating suite configuration of the present disclosure can provide higher seating density than current seating options without the use of motorized seats.

For example, and referring generally to FIGS. 1 through 28, a vehicular seating suite configuration (e.g., vehicular seating suite configuration 10) may include a plurality of vertically stacked seating suites. In some embodiments, the vehicular seating suite configuration (e.g., vehicular seating suite configuration 10) may include a lower seating suite (e.g., lower seating suite 12) and an upper seating suite (e.g., upper seating suite 14). While reference is made throughout the figures and the detailed description to two vertically stacked seating suites, it will be appreciated that any number of seating suites may be stacked within the vehicular seating suite configuration of the present disclosure. For example, a vehicular seating suite configuration may include a lower seating suite and at least one upper seating suite.

Figure 1:
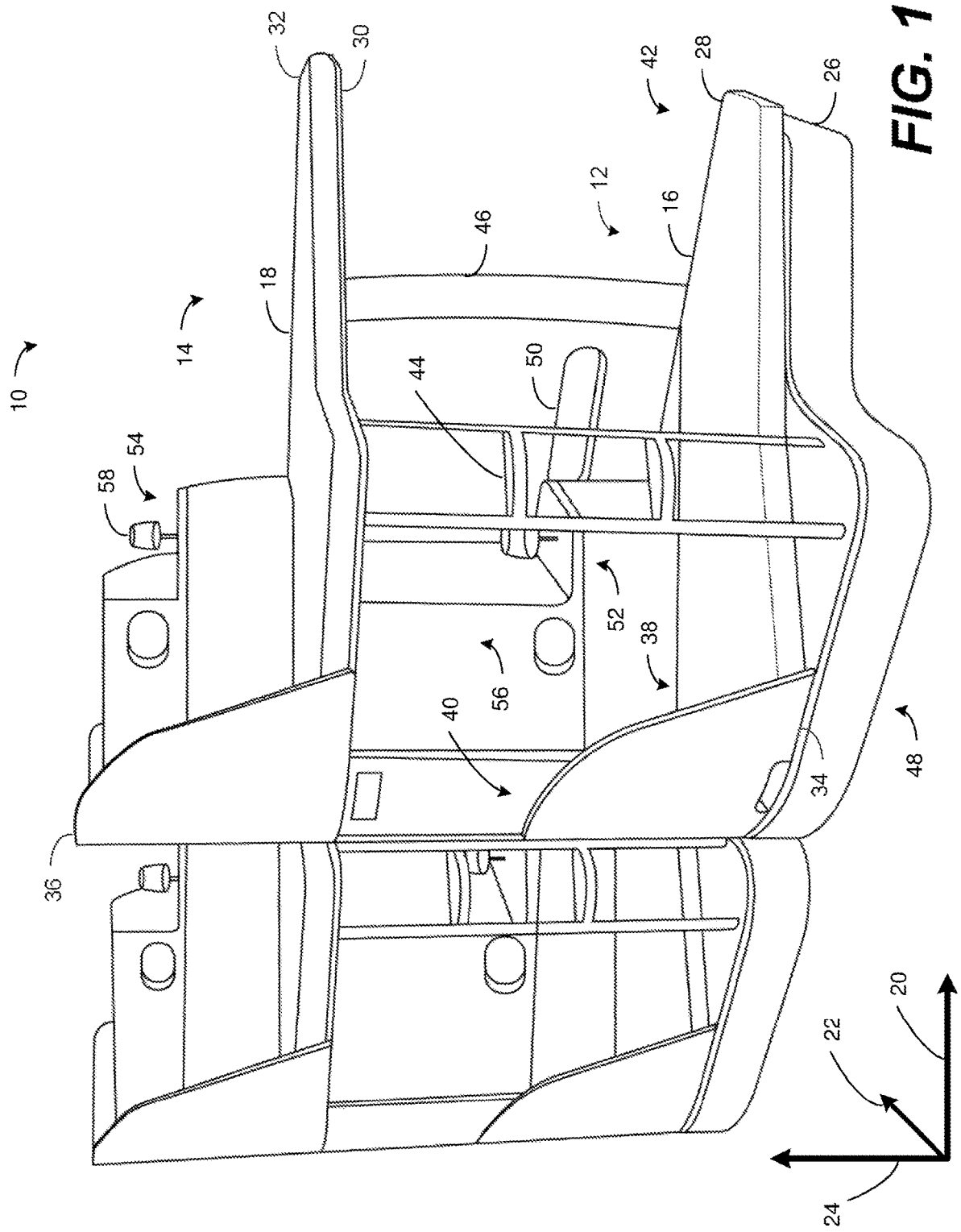
FIGS. 1-3 are various perspective views of a vehicular seating suite configuration, according to an example embodiment.

In some embodiments, the vehicular seating suite configuration (e.g., vehicular seating suite configuration 10) may be configured to be positioned within a vehicle. In the example of FIG. 1, vehicular seating suite configuration (e.g., vehicular seating suite configuration 10) may be positioned within the fuselage of an aircraft, such as an airplane. However, it will be appreciated that embodiments of the vehicular seating suite configuration of the present disclosure may be adapted to and positioned within any vehicle, such as an aircraft, a boat, a train, a bus, a car, etc. In a preferred embodiment, the vehicular seating suite configuration (e.g., vehicular seating suite configuration 10) may be configured to be positioned within an aircraft and/or may be positioned within an airplane.

In some embodiments, each seating suite (e.g., lower seating suite 12 and upper seating suite 14) may include an elongated generally horizontal seating surface (e.g., elongated generally horizontal seating surface 16). Elongated, within the scope of the present disclosure, may generally include a length greater than a width, or long in proportion to width. For example, the elongated generally horizontal seating surface (e.g., elongated generally horizontal seating surface 16 of lower seating suite 12 and/or elongated generally horizontal seating surface 18 of upper seating suite 14) may have a length of e.g., 78 inches, and a width of e.g., 30 inches. It will be appreciated that other lengths and widths may be used within the scope of the present disclosure while maintaining an elongated seating surface that is long in proportion to its width. In some embodiments, elongated generally horizontal seating surface 16 of lower seating suite 12 may be structurally the same as or different from elongated generally horizontal seating surface 18 of upper seating suite 14. For example, the dimensions of elongated generally horizontal seating surface 16 of lower seating suite 12 may be the same as or different from elongated generally horizontal seating surface 18 of upper seating suite 14. Generally horizontal, within the scope of the present disclosure, may include an orientation generally parallel to the longitudinal axis of the vehicle.

For example, and as shown in FIG. 1, an example coordinate system referencing a longitudinal axis (e.g., longitudinal axis 20), a lateral axis (e.g., lateral axis 22), and a vertical axis (e.g., vertical axis 24) is provided for reference. In some embodiments, the longitudinal axis (e.g., longitudinal axis 20) may generally describe the axis along the length of the vehicle from the front to the back along the direction of travel of the vehicle. The lateral axis (e.g., lateral axis 22) may generally describe the axis along the width of the vehicle from side to side. The vertical axis (e.g., vertical axis 24) may generally describe the axis along the height of the vehicle from bottom to top.

Accordingly, the elongated generally horizontal seating surface (e.g., elongated generally horizontal seating surface 16) may extend generally along the longitudinal axis (e.g., longitudinal axis 20) of the vehicle. It will be appreciated that the elongated generally horizontal seating surface (e.g., elongated generally horizontal seating surface 16) is not required to be exactly parallel with this reference plane defined by the longitudinal axis (e.g., longitudinal axis 20) and the lateral axis (e.g., lateral axis 22) of the vehicle. In this manner, embodiments of the elongated generally horizontal seating surface may have at least some vertical distance or gradient between its ends (e.g., sloping up from one end to another or sloping down from one end to another). As will be discussed in greater detail below, it will be appreciated that the vertical distance or pitch between the ends can be constrained by the lying position of a passenger. In other words, the amount of vertical distance between the ends of the elongated generally horizontal seating surface may be constrained to a gradient that would allow a passenger to lay on the elongated generally horizontal seating surface. It will also be appreciated that the elongated generally horizontal seating surface (e.g., elongated generally horizontal seating surface 16) may be at least partially rotated about the longitudinal axis (e.g., longitudinal axis 20).

In some embodiments, the elongated generally horizontal seating surface (e.g., elongated generally horizontal seating surface 16 and/or elongated generally horizontal seating surface 18) may be a unitary body or may include multiple adjacent bodies. For example, and as will be discussed in greater detail below, the elongated generally horizontal seating surface may include a seating portion and a bed portion. In some embodiments, the elongated generally horizontal seating surface (e.g., elongated generally horizontal seating surface 16 and/or elongated generally horizontal seating surface 18) may include a rigid portion (e.g., rigid portion 26 for elongated generally horizontal seating surface 16 or rigid portion 30 for elongated generally horizontal seating surface 18) configured to support the weight of a passenger and a padded portion (e.g., padded portion 28 for elongated generally horizontal seating surface 16 or padded portion 32 for elongated generally horizontal seating surface 18) configured to cushion the passenger from the rigid portion. In some embodiments, the rigid portion 26 of lower seating suite 12 may include a platform to support elongated generally horizontal seating surface 16). The padding portion (e.g., padded portion 28 and/or padded portion 32) may include various fabrics, cushioning elements, etc. known in the art. In this manner, a passenger may lay down on the elongated horizontal seating surface (e.g., elongated generally horizontal seating surface 16 and/or elongated generally horizontal seating surface 18) comfortably.

In some embodiments, the elongated generally horizontal seating surface may be configured to accommodate a person in a lying position. As discussed above and in some embodiments, the length of the elongated horizontal seating surface (e.g., elongated generally horizontal seating surface 16 and/or elongated generally horizontal seating surface 18) may be such that a passenger can lay down with their head at one end and their feet adjacent to the opposite end. As will be discussed in greater detail below, embodiments of the present disclosure may allow a passenger to move from a sitting position on the elongated horizontal seating surface (e.g., elongated generally horizontal seating surface 16 and/or elongated generally horizontal seating surface 18) to a lying position on the horizontal seating surface (e.g., elongated generally horizontal seating surface 16 and/or elongated generally horizontal seating surface 18) during travel on a vehicle without the use of motorized components. However, in some embodiments, the elongated horizontal seating surface (e.g., elongated generally horizontal seating surface 16) may include motorized components for reclining or orienting.

In some embodiments, each seating suite (e.g., lower seating suite 12 and upper seating suite 14) may include a generally vertical backrest portion (e.g., generally vertical backrest portion 34 for lower seating suite 12 and/or generally vertical backrest portion 36 for upper seating suite 14) adjacent to a proximal end (e.g., proximal end 38) of the elongated generally horizontal seating surface (e.g., elongated generally horizontal seating surface 16). It will be appreciated that elongated generally horizontal seating surface 18 similarly has a proximal end. In some embodiments, generally vertical backrest portion (e.g., generally vertical backrest portion 34 for lower seating suite 12 and/or generally vertical backrest portion 36 for upper seating suite 14) may include an orientation generally parallel to the vertical axis (e.g., vertical axis 24) of the vehicle. In other words, the generally vertical backrest portion (e.g., generally vertical backrest portion 34 for lower seating suite 12 and/or generally vertical backrest portion 36 for upper seating suite 14) may generally extend along the vertical axis (e.g., vertical axis 24) of the vehicle. It will be appreciated that the generally vertical backrest portion (e.g., generally vertical backrest portion 34 for lower seating suite 12 and/or generally vertical backrest portion 36 for upper seating suite 14) may be angled relative to the proximal end (e.g., proximal end 38) of the elongated generally horizontal seating surface (e.g., elongated generally horizontal seating surface 16) to provide at least a partial recline. For example and in some embodiments, the generally vertical backrest portion (e.g., generally vertical backrest portion 34) may be perpendicular to the elongated generally horizontal seating surface (e.g., elongated generally horizontal seating surface 16). In some embodiments, the generally vertical backrest portion (e.g., generally vertical backrest portion 34) may be oriented relative to the elongated generally horizontal seating surface (e.g., elongated generally horizontal seating surface 16) to form an obtuse angle (e.g., an angle measured from the proximal end (e.g., proximal end 38) of the elongated generally horizontal seating surface (e.g., elongated generally horizontal seating surface 16) to a distal end (e.g., distal end 40) of the generally vertical backrest portion (e.g., generally vertical backrest portion 34)). Again, while reference is made in FIG. 1 to distal end 40 of generally vertical backrest portion 34, it will be appreciated that generally vertical backrest portion 36 similarly has a distal end. In this manner, the combination of the elongated generally horizontal seating surface and the generally vertical backrest portion may be configured to provide a reclined seat for a passenger. In some embodiments, the generally vertical backrest portion (e.g., generally vertical backrest portion 34) may include a rigid portion configured to support a passenger's back and a padded portion configured to cushion the passenger from the rigid portion. The padding portion may include various fabrics, cushioning elements, etc. known in the art. In this manner, a passenger may rest their back against the generally vertical backrest portion (e.g., generally vertical backrest portion 34) comfortably.

As discussed above and in some embodiments, the elongated generally horizontal seating surface and the generally vertical backrest portion may be configured to accommodate a person in a sitting position. For example, many vehicles have requirements for passengers to be secured in a sitting position during certain periods of travel. For example, as an aircraft is taxiing, taking off, or landing, regulations require each passenger to be in a sitting position. It will be appreciated that each passenger may be required to be in a sitting position (as opposed to standing in the vehicle or in a lying position) during other periods of travel. In this manner, a passenger may easily move from a lying position (e.g., with the passenger's head near proximal end 38 of elongated generally horizontal seating surface 16 and with the passenger's legs extending toward distal end 42 of elongated generally horizontal seating surface 16) to a sitting position (e.g., with the passenger's back against generally vertical backrest portion 34, the passenger's hips near proximal end 38 of elongated generally horizontal seating surface 16, and/or with the passenger's legs extending at least partially toward distal end 42 of elongated generally horizontal seating surface 16) and vice versa. While reference has been made to lower seating suite 12, it will be appreciated that the above discussion applies to upper seating suite 14.

Figure 2:
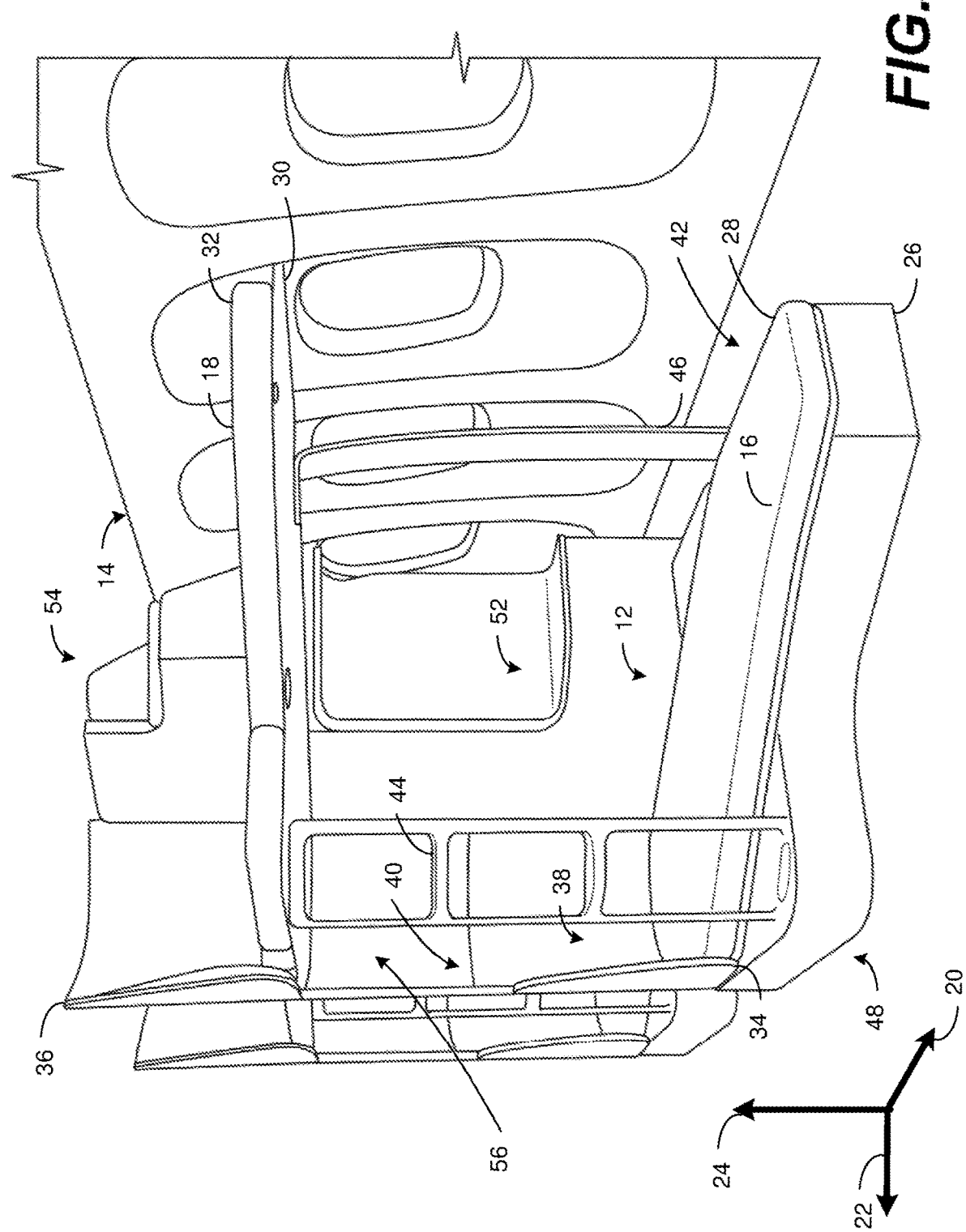
Figure 3:
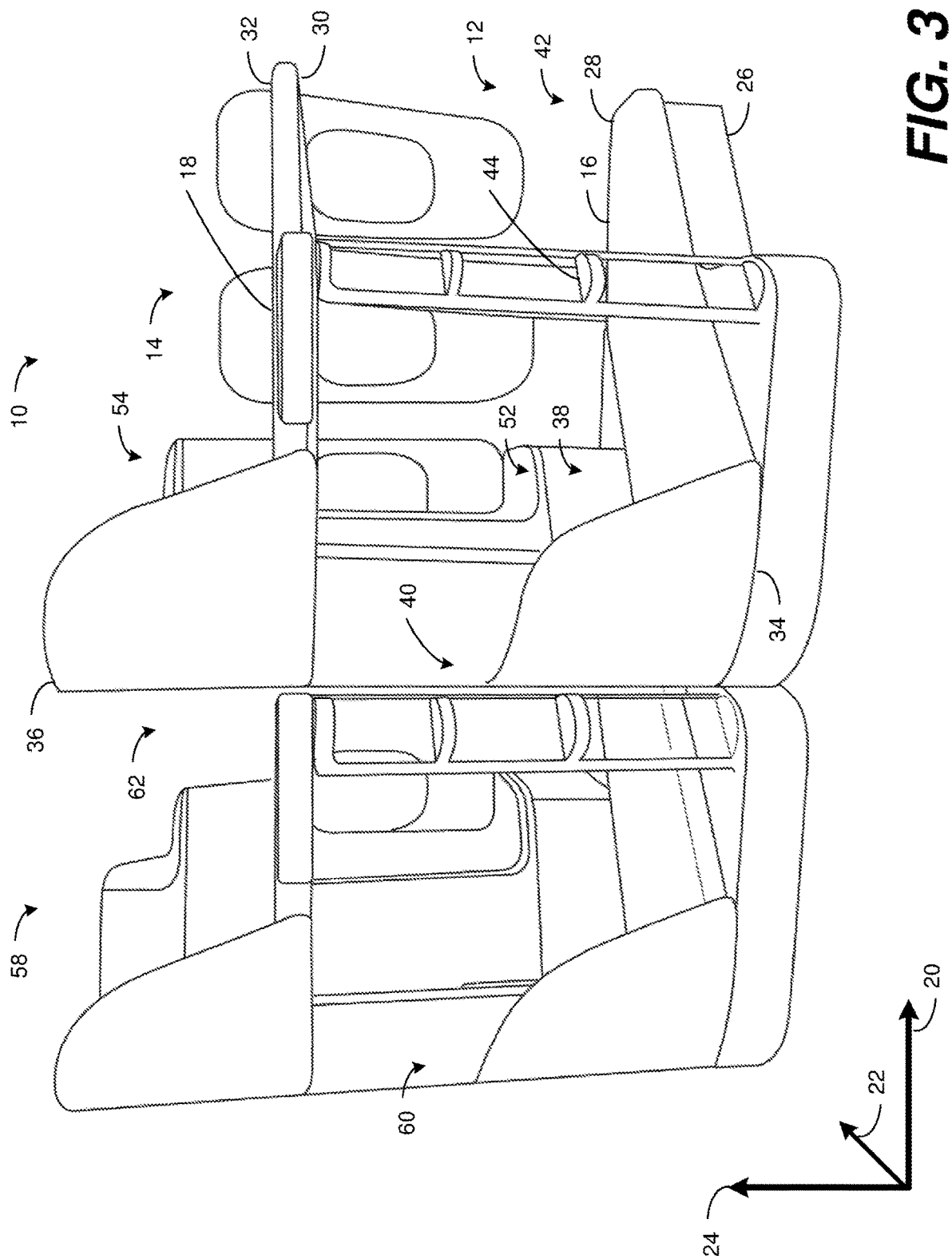

Referring also to FIG. 2 and in some embodiments, the elongated generally horizontal seating surface 16 may be angled away from the longitudinal axis 20 of the vehicle. Angled away may generally include any orientation extending along the longitudinal axis 20 of the vehicle but not in parallel with the longitudinal axis 20 of the vehicle. As shown in FIG. 2, elongated generally horizontal seating surface 16 may generally extend along longitudinal axis 20 of the vehicle (e.g., aircraft) but at unparallel angle relative to the longitudinal axis 20. In some embodiments, the elongated generally horizontal seating surface 16 may be oriented in any angle ranging from parallel to the longitudinal axis 20 of the vehicle to perpendicular to the longitudinal axis 20 of the vehicle. As will be discussed in greater detail below, angling away the elongated generally horizontal seating surface 16 may allow for higher seating density within a vehicle.

The generally vertical backrest portion 34 may be aligned with the longitudinal axis 20 of the vehicle. For example, when a passenger is sitting with their back resting against generally vertical backrest portion 34, a passenger may be oriented in parallel with longitudinal axis 20. However, in some embodiments, generally vertical backrest portion 34 may be oriented in the same direction as elongated generally horizontal seating surface 16. In some embodiments, generally vertical backrest portion 34 may be oriented in a different direction from elongated generally horizontal seating surface 16.

In some embodiments and referring again to FIG. 1, a ladder may be disposed between a lower seating suite and an upper seating suite. As discussed above, vehicular seating suite configuration 10 may include a lower seating suite (e.g., lower seating suite 12) and an upper seating suite (e.g., upper seating suite 14). In some embodiments, a ladder (e.g., ladder 44) may be disposed between a lower seating suite (e.g., lower seating suite 12) and an upper seating suite (e.g., upper seating suite 14). Ladder 44 may be disposed anywhere between lower seating suite 12 and upper seating suite 14. For example and in some embodiments, ladder 44 may be adjacent to proximal end 38 of elongated generally horizontal seating surface 16. In some embodiments, ladder 44 may be a rigid structure configured to accommodate the weight of a passenger. Ladder 44 may be formed from any metal, metal alloy, plastic, wood, synthetic materials, etc. known in the art. In some embodiments, a support structure or support structures (e.g., support structure 46) may be disposed between a lower seating suite (e.g., lower seating suite 12) and an upper seating suite (e.g., upper seating suite 14).

In some embodiments, vehicular seating suite configuration 10 may include at least one storage compartment disposed beneath at least a portion of a lower seating suite. For example, a storage compartment (e.g., storage compartment 48) may be disposed beneath the lower seating suite (e.g., lower seating suite 12). In some embodiments, a plurality of storage compartments (e.g., storage compartment 48) may be disposed beneath the lower seating suite (e.g., lower seating suite 12) to provide a storage compartment (e.g., for luggage or other personal belongings) for each passenger of each pair of stacked seating suites (e.g., lower seating suite 12 and upper seating suite 14).

In some embodiments, each seating suite may include a tray table disposed adjacent to the proximal end of the elongated generally horizontal seating surface. Referring also to FIG. 1 and in some embodiments, a seating suite (e.g., lower seating suite 12) may include a tray table (e.g., tray table 50) disposed adjacent to proximal end 38 of elongated generally horizontal seating surface 16. In some embodiments, tray table 50 may be rotatably coupled to a side console (e.g., side console 52 of lower seating suite 12 or side console 54 of upper seating suite 14) of the seating suite (e.g., lower seating suite 12 or upper seating suite 14) and configured to rotate across at least a portion of the elongated generally horizontal seating surface (e.g., elongated generally horizontal seating surface 16 or elongated generally horizontal seating surface 18). In this manner, a passenger may use tray table 50 while in a sitting position by rotating table tray 50 across their lap. In some embodiments, tray table 50 may fold out or extend out from the side console (e.g., side console 52 or side console 54).

As discussed above and in some embodiments, each seating suite may include a side console. In some embodiments, side console 52 may be incorporated into an enclosure or wall (e.g., wall 56) of the seating suite (e.g., lower seating suite 12). In some embodiments, side console 54 may include a lamp (e.g., lamp 58) or other lighting fixture(s).

In some embodiments, each seating suite may be at least partially enclosed. For example, each seating suite may include walls around at least part of the seating suite. In the examples of FIGS. 1-3, 5-7, and 17-28, a seating suite may include walls extending from behind or from the top of the generally vertical backrest portion around the back if the generally vertical backrest portion and at least partially around at least one side of the elongated generally horizontal seating surface. In the example of FIG. 2 where the lower seating suite is positioned along an interior wall of the vehicle, the wall (e.g., wall 56) may extend around the back of generally vertical backrest portion 34 and at least partially vertically between generally vertical backrest portion 34 and the bottom of upper seating suite 14. Further in this example, wall 56 may extend along one side of elongated generally horizontal seating surface 16 and may taper to form side console 52. In some embodiments, each seating suite may be almost entirely enclosed by wall 56 (e.g., a gap in wall 56 to allow for a passenger to access the seating suite). It will be appreciated that each seating suite may be at least partially enclosed in various configurations within the scope of the present disclosure. For example, a seating suite positioned against a wall of a vehicle may be less enclosed than a seating suite positioned within the middle of the vehicle.

In some embodiments, each vehicular seating suite configuration may be configured to nest against at least one other vehicular seating suite configuration. In some embodiments and referring also to the example of FIG. 3, a first vehicular seating suite configuration (e.g., vehicular seating suite configuration 10) including a lower seating suite (e.g., lower seating suite 12) and an upper seating suite (e.g., upper seating suite 14) may be configured to nest against a second vehicular seating suite configuration (e.g., vehicular seating suite configuration 58) including a lower seating suite (e.g., lower seating suite 60) and an upper seating suite (e.g., upper seating suite 62). Referring also to the example of FIG. 4 and in some embodiments, a plurality of vehicular seating configurations (e.g., vehicular seating suite configurations 402, 404, 406) may be nested against one another. As can be seen from FIG. 4, each seating suite may include at least one concave portion and at least one convex portion. In some embodiments, the at least one concave portion of each vehicular seating suite configuration may be configured to receive at least one convex portion of an adjacent vehicular seating suite configuration. For example, upper seating suite 408 of first vehicular seating configuration 404 may include concave portion 410 that may be configured to at least partially receive convex portion 412 of upper seating suite 414 of second vehicular seating configuration 404. This pattern may be duplicated for lower seating suites as to allow a plurality of vehicular seating suite configurations to nest together (e.g., lower seating suites nesting against lower seating suites and upper seating suites nesting against upper seating suites).

Figure 4:
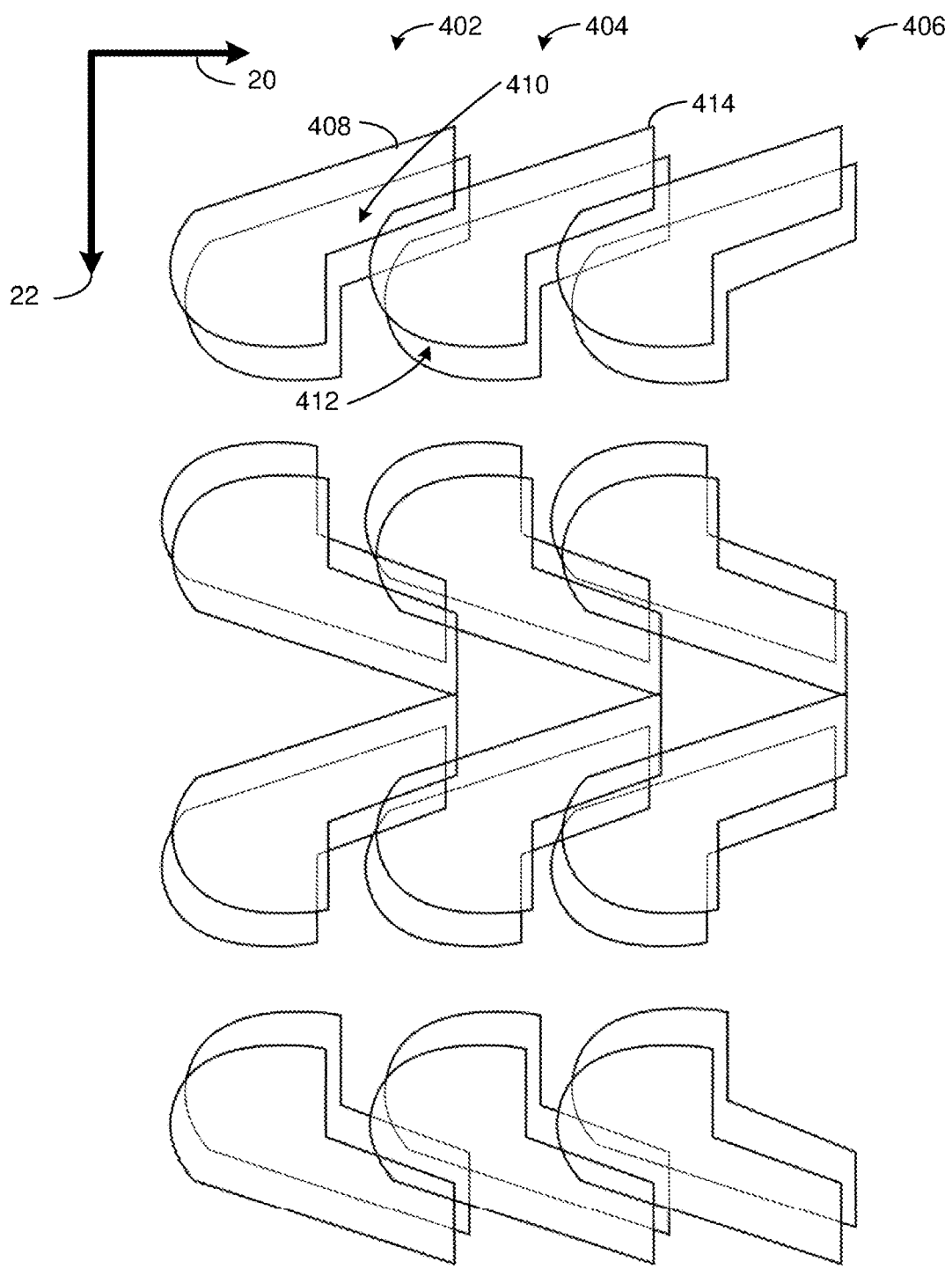
FIG. 4 is a top plan view of a plurality of vehicular seating suite configurations, according to an example embodiment.

In some embodiments, the plurality of vehicular seating suite configurations may be positioned in a vehicle as shown in FIG. 4. In this example, the plurality of vehicular seating suite configurations may be oriented in a "reverse herringbone" pattern within the vehicle. In some embodiments, the reverse herringbone pattern may allow a higher seating density than conventional seating layouts. In a preferred embodiment, an aircraft fuselage may include at least one column of nested vehicular seating suite configurations against the edges of the fuselage and at least one central column of nested vehicular seating suite configurations along the longitudinal axis 20 of the aircraft. However, it will be appreciated that various positions are possible within the scope of the present disclosure. Referring also to FIG. 2 and in some embodiments, the vehicular seating suite configuration (e.g., vehicular seating suite configuration 10) may be configured to be positioned against a curved wall of an aircraft fuselage. In this example, the upper seating suite (e.g., upper seating suite 14) may have curved walls and edges to contour to the curved wall of the aircraft fuselage. It will be appreciated that the upper and lower seating suites of a vehicular seating suite configuration may be contoured to fit various positions within a vehicle.

Figure 5:
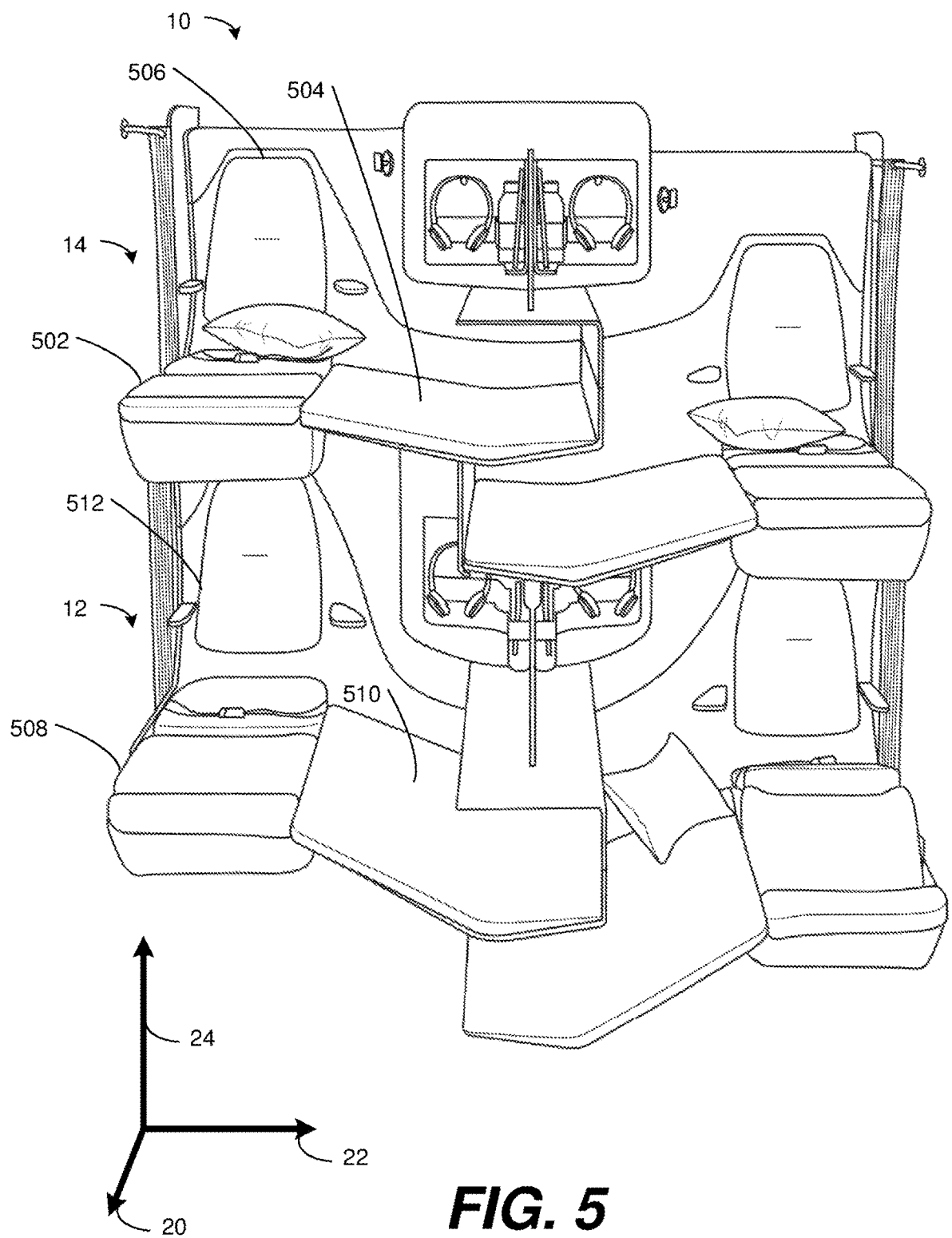
FIG. 5 is a front elevation view of a vehicular seating suite configuration, according to an example embodiment.
Figure 7:
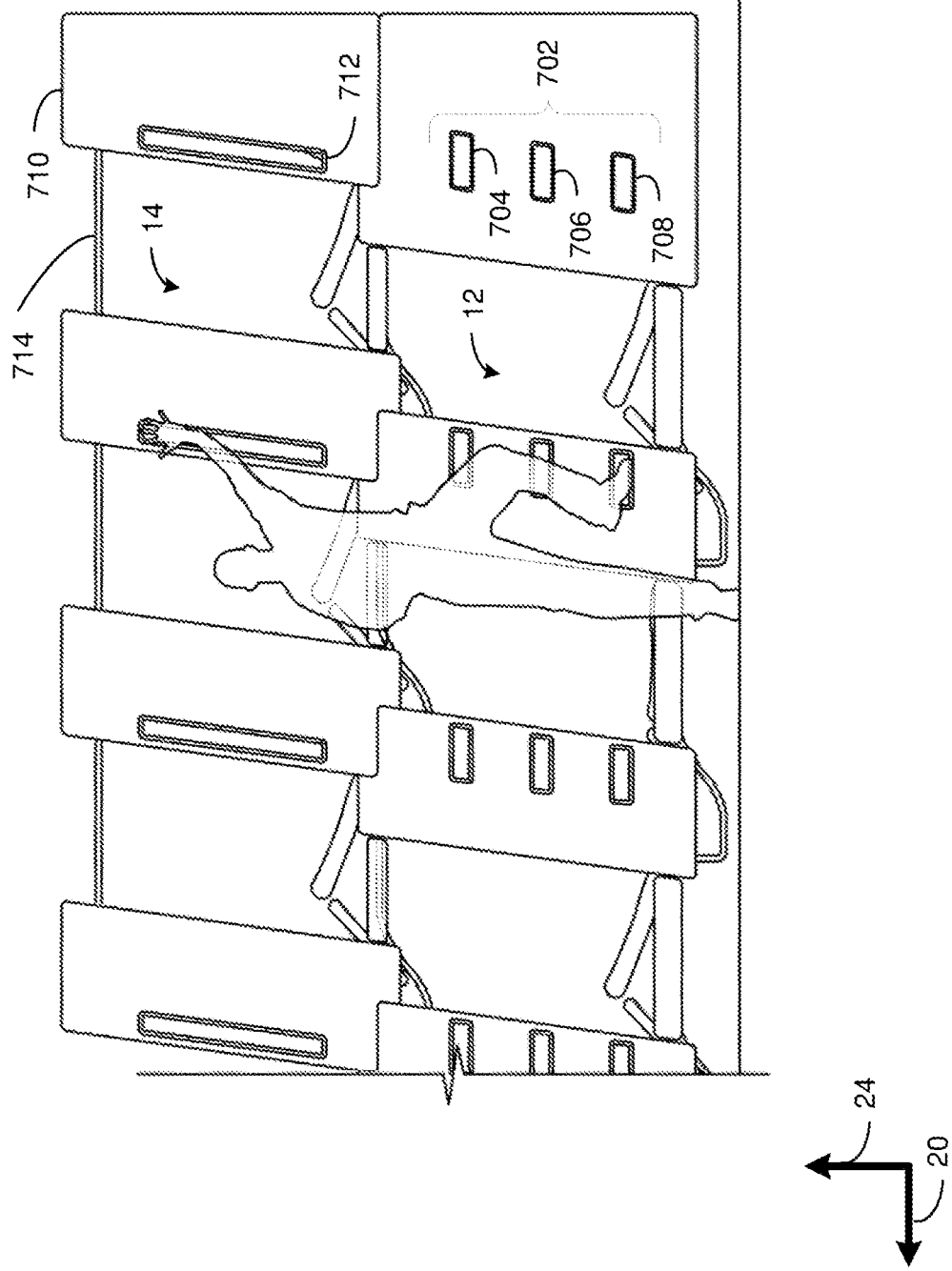
FIGS. 7-8 are side views of a vehicular seating suite configuration, according to an example embodiment.
Figure 8:
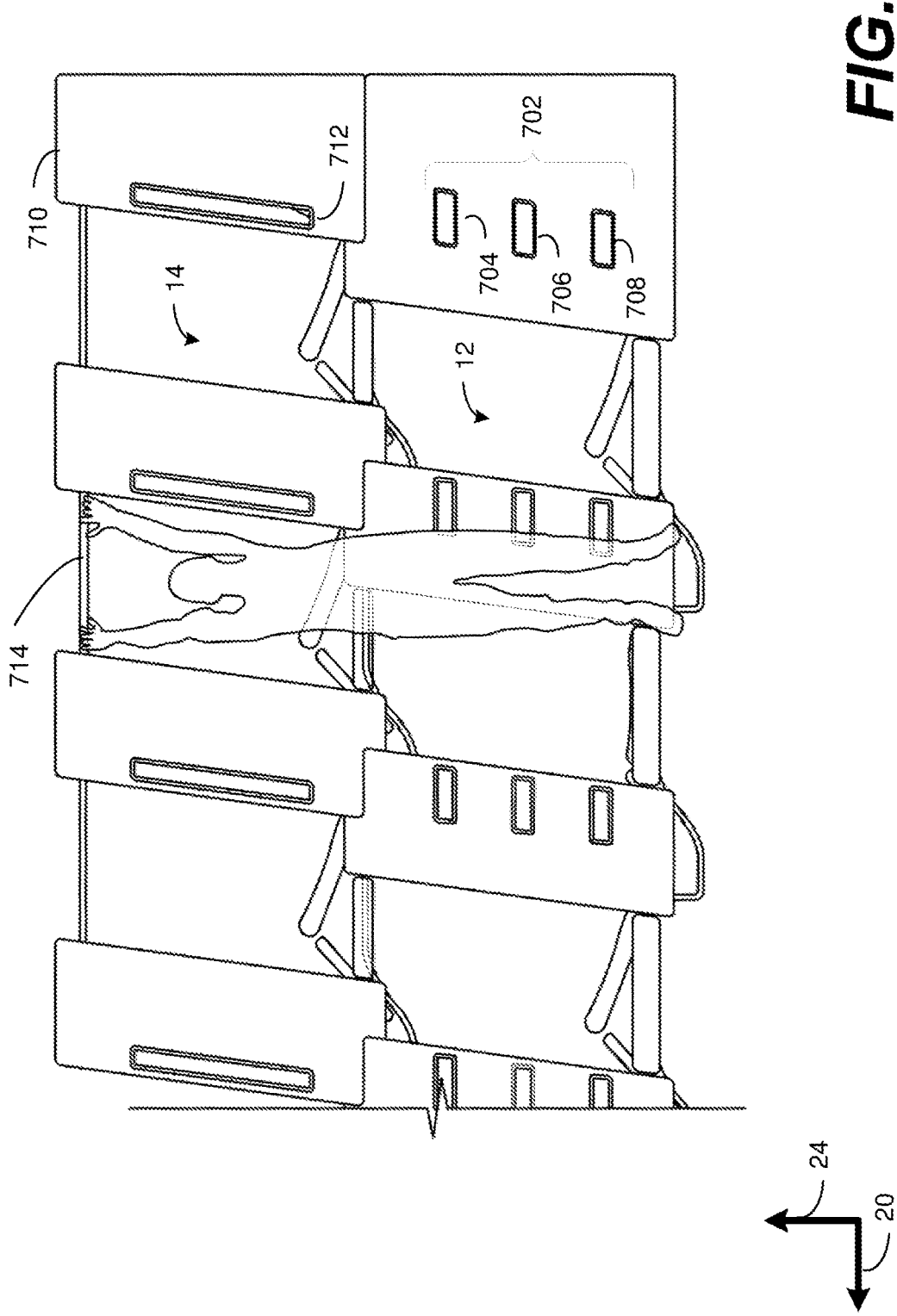
Figure 9:
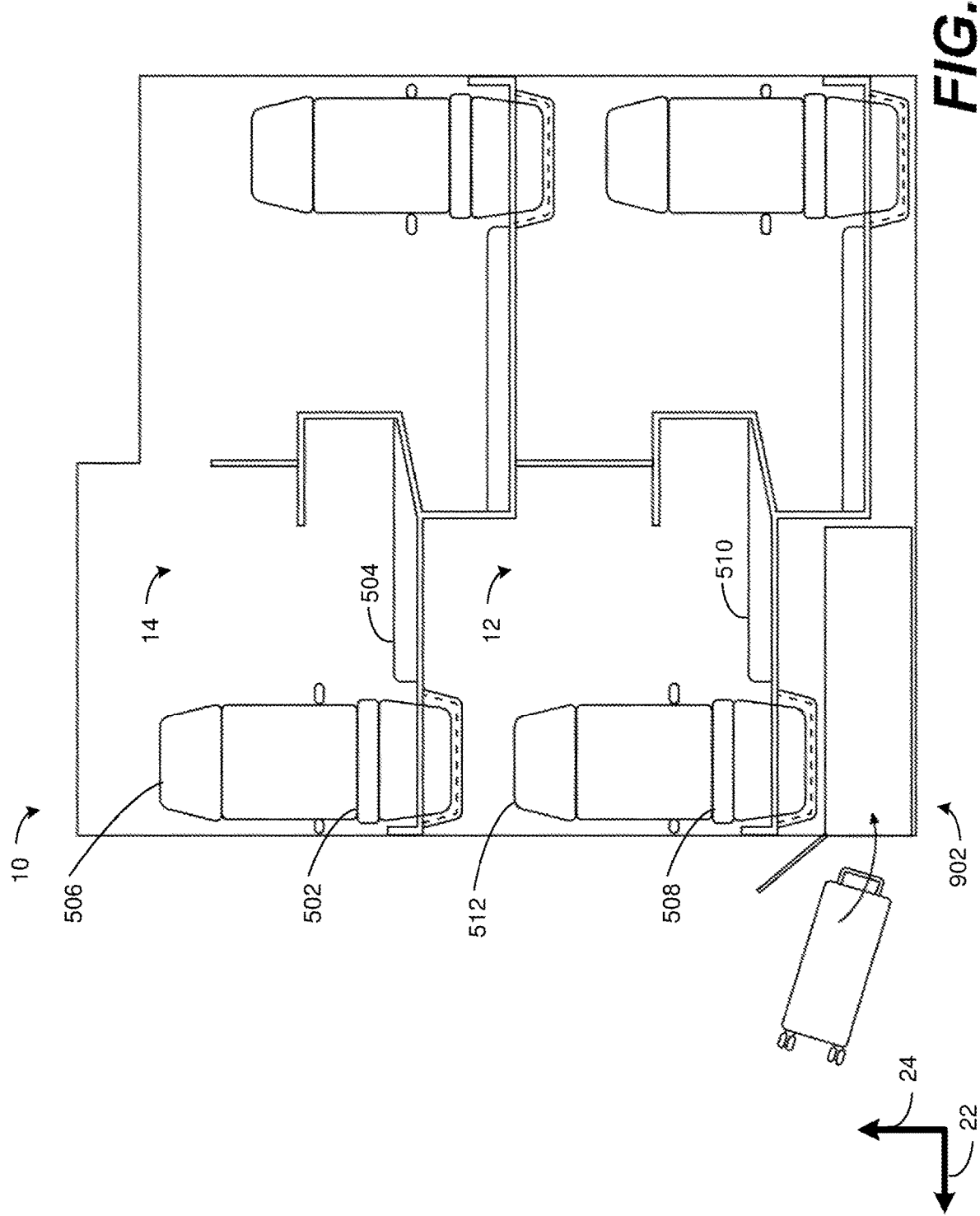
FIG. 9 is a front view and a top plan view of a vehicular seating suite configuration, according to an example embodiment.

According to another implementation, a vehicular seating suite configuration may include a plurality of vertically stacked seating suites. Referring also to FIGS. 5-6 and in some embodiments, vehicular seating suite configuration 10 may include lower seating suite 12 and upper seating suite 14. As discussed above, while two seating suites are shown stacked vertically in vehicular seating suite configuration 10, it will be appreciated that any number of seating suites may be vertically stacked within the scope of the present disclosure. In some embodiments, each seating suite may include a generally horizontal seating portion and a generally horizontal bed portion adjacent to the generally horizontal seating portion. For example, and as shown in FIG. 5, a seating suite (e.g., upper seating suite 14) may include generally horizontal seating portion 502 and generally horizontal bed portion 504 adjacent to generally horizontal seating portion 502. While reference is made to upper seating suite 14 it will be appreciated that the features of upper seating suite 14 may be replicated in lower seating suite 12 and vice versa. For example, a seating suite (e.g., lower seating suite 12) may include generally horizontal seating portion 508 and generally horizontal bed portion 510 adjacent to generally horizontal seating portion 508.

In some embodiments, generally horizontal seating portion 502 may include a rigid portion configured to support the weight of a passenger and a padded portion configured to cushion the passenger from the rigid portion. The padding portion may include various fabrics, cushioning elements, etc. known in the art.

In some embodiments, and as shown in the example of FIG. 6, the generally horizontal bed portion in combination with the generally horizontal seating portion may be configured to accommodate a person in a lying position. As discussed above and in some embodiments, the length of the generally horizontal seating portion (e.g., generally horizontal seating portion 502) and the generally horizontal bed portion (e.g., generally horizontal bed portion 504) may be such that a passenger can lay down with their head on the generally horizontal seating portion (e.g., generally horizontal seating portion 502) with the rest of their body on the generally horizontal bed portion (e.g., generally horizontal bed portion 504). As will be discussed in greater detail below, embodiments of the present disclosure may allow a passenger to move from a sitting position in the generally horizontal seating portion (e.g., generally horizontal seating portion 502) to a lying position on the combination of the generally horizontal seating portion (e.g., generally horizontal seating portion 502) and the generally horizontal bed portion (e.g., generally horizontal bed portion 504) during travel on a vehicle without the use of motorized components. However, in some embodiments, the generally horizontal seating portion (e.g., generally horizontal seating portion 502) and/or the generally horizontal bed portion (e.g., generally horizontal bed portion 504) may include motorized components for reclining or orienting.

In some embodiments, the generally horizontal seating portion may be aligned with a longitudinal axis of a vehicle and the generally horizontal bed portion may be angled away from the longitudinal axis of the vehicle. For example, and referring also to the example of FIG. 5, generally horizontal seating portion 502 may be aligned or in parallel with longitudinal axis 20 of a vehicle and generally horizontal bed portion 504 may be angled away from longitudinal axis 20. As discussed above, angled away may generally include any angle not parallel or unparallel to the longitudinal axis 20. In some embodiments, the angled orientation of generally horizontal bed portion 504 may allow a higher seating density of seating suites. While examples have been provided of a generally horizontal seating portion aligned with the longitudinal axis 20 of the vehicle, it will be appreciated that the generally horizontal seating portion may be oriented in any direction within the vehicle. In some embodiments, regardless of the orientation of the generally horizontal seating portion relative to the longitudinal axis 20 of the vehicle, the generally horizontal bed portion may be angled away relative to the direction of the generally horizontal seating portion.

In some embodiments, each seating suite may include a generally vertical backrest portion disposed adjacent to a proximal end of the generally horizontal seating portion. For example and referring again to FIG. 5, a seating suite (e.g., upper seating suite 14) may include a generally vertical backrest portion (e.g., generally vertical backrest portion 506) disposed adjacent to proximal end of generally horizontal seating portion 502. Lower seating suite 12 may include a generally vertical backrest portion (e.g., generally vertical backrest portion 512) disposed adjacent to proximal end of generally horizontal seating portion 508. As discussed above, generally vertical backrest portion 512 may be stationary and/or configured to recline. In some embodiments, generally vertical backrest portion 512 may not include any motorized components. However, it will be appreciated that in some embodiments, generally vertical backrest portion 512 may include motorized components.

As discussed above and in some embodiments, the generally horizontal seating portion and the generally vertical backrest portion may be configured to accommodate a person in a sitting position. For example, many vehicles have requirements for each passenger to be secured in a sitting position during certain periods of travel. For example, as an aircraft is taxiing, taking off, or landing, regulations require each passenger to be in a sitting position. It will be appreciated that each passenger may be required to be in a sitting position (as opposed to standing in the vehicle or in a lying position) during other periods of travel. In this manner and referring again to FIG. 6, a passenger may easily move from a lying position (e.g., with the passenger's head on the generally horizontal seating portion 502 with the passenger's body extending toward distal end of generally horizontal bed portion 504) to a sitting position (e.g., with the passenger's back against generally vertical backrest portion 506 and with the passenger's hips on the generally horizontal seating portion 502) and vice versa.

As discussed above, a ladder may be disposed between a lower seating suite and an upper seating suite. In some embodiments, ladder 44 may be disposed anywhere between lower seating suite 12 and upper seating suite 14. In some embodiments and referring also to FIG. 7, ladder 702 may be incorporated into an enclosure around at least part of each seating suite. Ladder 702 may be defined by a plurality of openings or apertures (e.g., apertures 704, 706, 708) within an enclosure (e.g., enclosure 710) of one or more of lower seating suite 12 and upper seating suite 14. In some embodiments, the plurality of openings or apertures (e.g., apertures 704, 706, 708) that define ladder 702 may be reinforced with metal or other high strength material. In some embodiments, each of the plurality of openings or apertures (e.g., apertures 704, 706, 708) may have smoothed edges to facilitate insertion and removal of hands and/or feet when using ladder 702. In some embodiments, one or more seating suites may include one or more handrails (e.g., handrail 712) to provide safe access to and from upper seating suite 14. In some embodiments, seating suites may include a rail (e.g., rail 714) that may be used to assist a passenger in an exiting or emergency scenario. For example, a passenger can use rail 714 to lower himself or herself from upper seating suite 14. By seating with passenger's legs over the edge and reaching up to the rail, the passenger can easily lower her self or himself to the vehicle floor.

In some embodiments, vehicular seating suite configuration 10 may include at least one storage compartment disposed beneath at least a portion of a lower seating suite. For example and referring also to FIG. 9, a storage compartment (e.g., storage compartment 902) may be disposed beneath the lower seating suite (e.g., lower seating suite 12). In some embodiments, a plurality of storage compartments (e.g., storage compartment 902) may be disposed beneath the lower seating suite (e.g., lower seating suite 12) to provide a storage compartment (e.g., for luggage or other personal belongings) for each passenger of each pair of stacked seating suites (e.g., lower seating suite 12 and upper seating suite 14).

In some embodiments, each seating suite may be at least partially enclosed. For example and as discussed above, each seating suite may be almost entirely enclosed by wall 1102 (e.g., a gap in wall 1102 to allow for a passenger to access the seating suite). In some embodiments, the gap in wall 1102 may include a curtain (e.g., curtain 1104) to provide a passenger privacy in their seating suite (e.g., seating suite 14).

In some embodiments, a distal end of at least one generally horizontal bed portion of the plurality of seating suites of a first vehicular seating suite configuration may be configured to at least partially overlap a distal end of at least one adjacent generally horizontal bed portion of a plurality of seating suites of a second vehicular seating suite configuration. Referring also to the examples of FIG. 13, a first vehicular seating suite configuration (e.g., first vehicular seating suite configuration 1302) may include a lower seating suite (e.g., lower seating suite 12) and an upper seating suite (e.g., upper seating suite 14) and a second vehicular seating suite configuration (e.g., second vehicular seating suite configuration 1304) may include a lower seating suite (e.g., lower seating suite 1306) and an upper seating suite (e.g., upper seating suite 1308). In this example, first vehicular seating suite configuration 1302 may be laterally adjacent to and nested against second vehicular seating suite configuration 1304. In some embodiments, the distal end (e.g., distal end 1310 and e.g., distal end 1312) of at least one generally horizontal bed portion (e.g., generally horizontal bed portion 504 and generally horizontal bed portion 510) of a plurality of seating suites (e.g., upper seating suite 14 and lower seating suite 12) of a first vehicular seating suite configuration (e.g., first vehicular seating suite configuration 1302) may at least partially overlap the distal end (e.g., distal end 1314 and e.g., distal end 1316) of at least one generally horizontal bed portion (e.g., generally horizontal bed portion 1314 and generally horizontal bed portion 1316) of a plurality of seating suites (e.g., upper seating suite 1308 and lower seating suite 1306) of a second vehicular seating suite configuration (e.g., second vehicular seating suite 1304). In some embodiments, first vehicular seating suite configuration 1302 may be laterally adjacent to and nested against second vehicular seating suite configuration 1304 in a column within the vehicle. In a preferred embodiment, first vehicular seating suite configuration 1302 may be laterally adjacent to and nested against second vehicular seating suite configuration 1304 in a center column within an aircraft fuselage.

Figure 10:
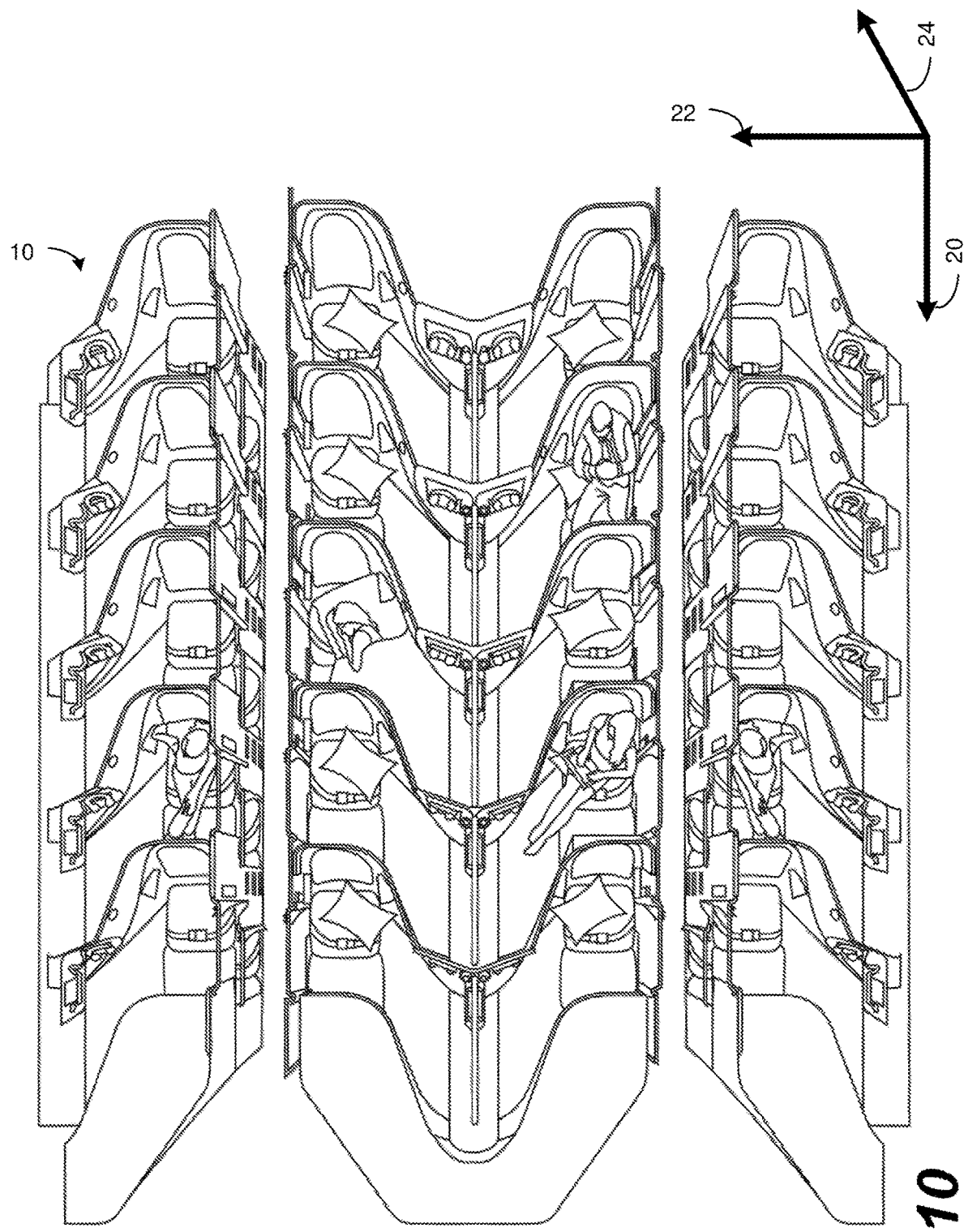
FIGS. 10-12 are various diagrammatic views of a vehicular seating suite configuration, according to an example embodiment.

Referring also to the example of FIG. 10 and in some embodiments, the first vehicular seating suite configuration 1302 and the second vehicular seating suite configuration 1304 may be manufactured with different widths to accommodate a range of vehicle types. For example, the overlap between vehicular seating suite configurations may be increased or decreased in order to fit on various vehicle types (e.g., aircraft types). The upper portion of FIG. 10 may include a narrower variant while the lower portion of FIG. 10 may include a wider variant.

Figure 15:
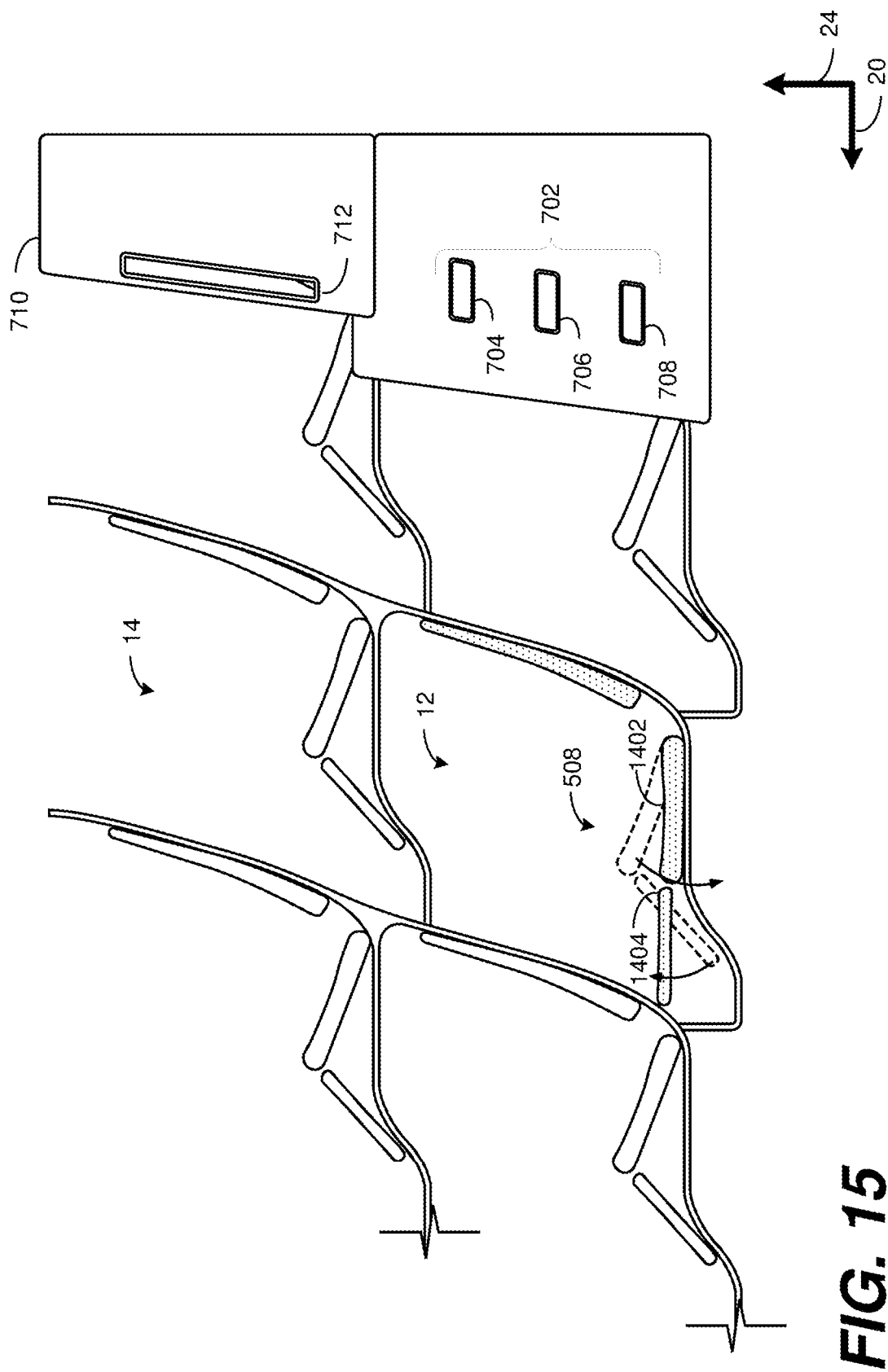
Figure 16B:
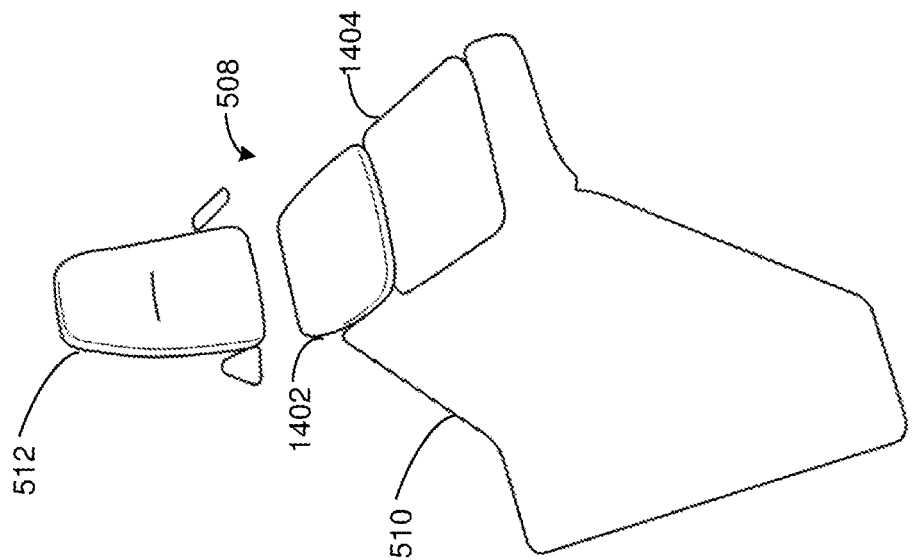
FIGS. 16A and 16B are perspective views of a seating portion and a bed portion of a seating suite, according to an example embodiment.
Figure 16A:
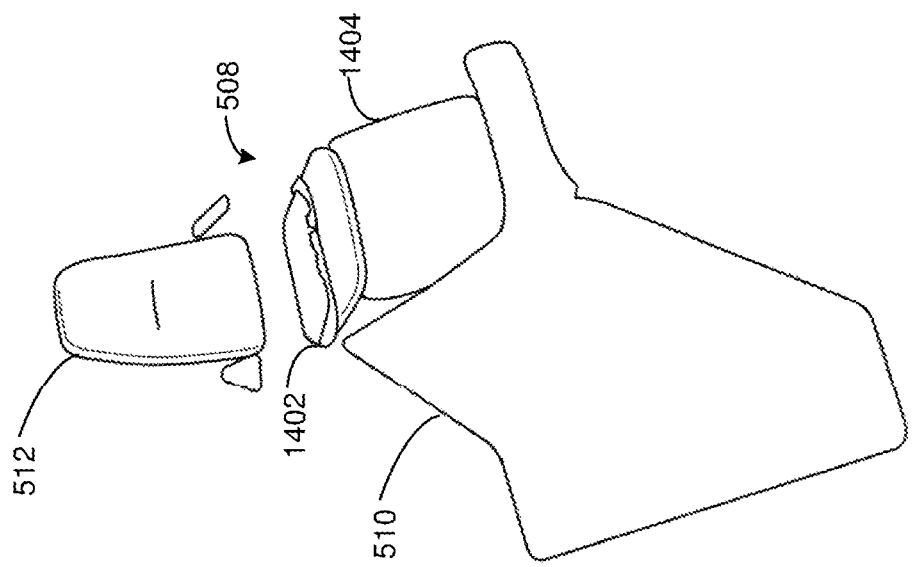
Figure 17:
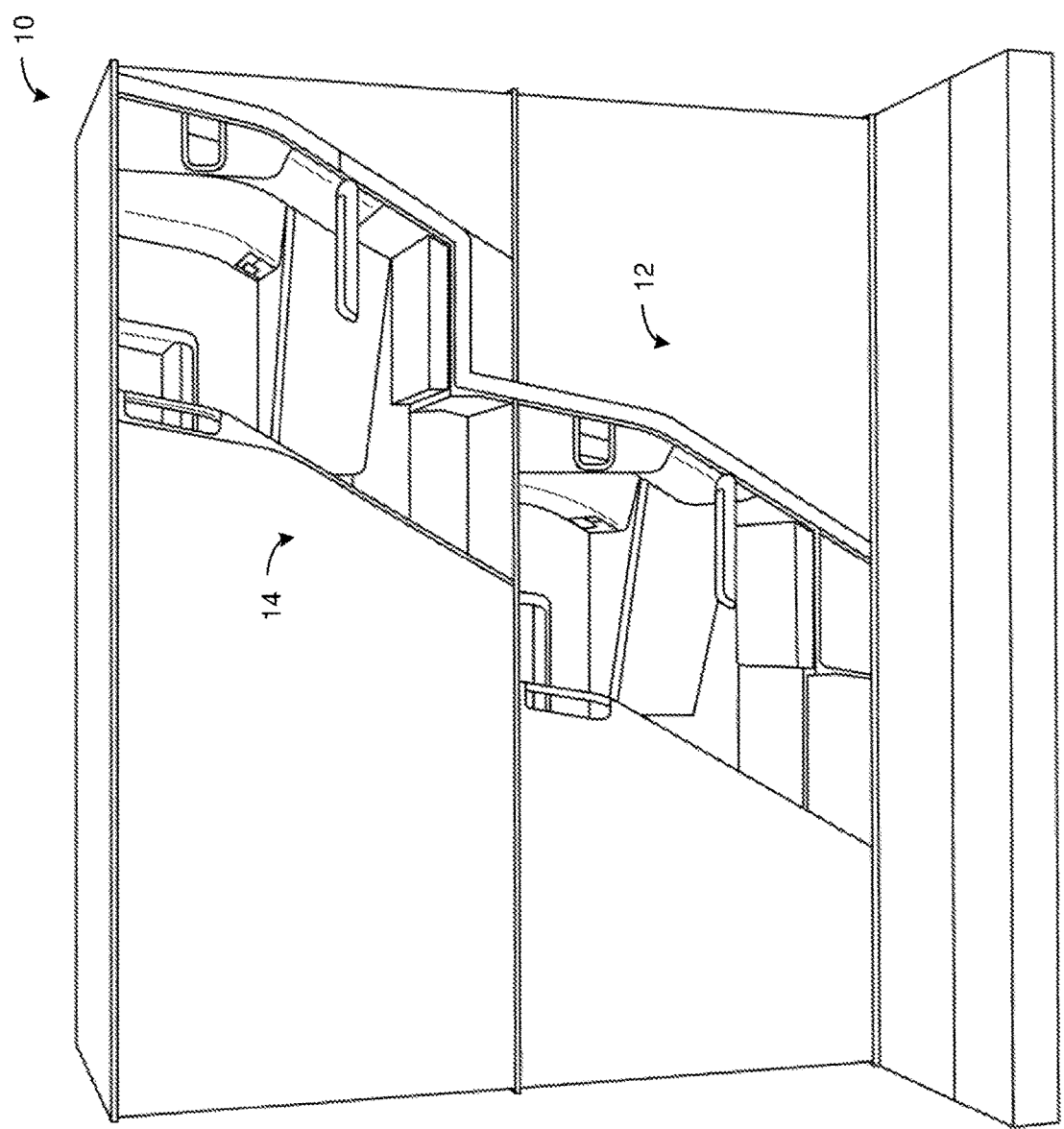
FIGS. 17-23 are various perspective views of a vehicular seating suite configuration, according to an example embodiment.

In some embodiments, the generally horizontal seating portion may include a seat pan and a leg rest coupled to the seat pan. For example and referring also to FIGS. 14-15, generally horizontal seating portion 508 may include seat pan 1402 and leg rest 1404 coupled to seat pan 1402. In some embodiments, seat pan 1402 may be moved together or separately to adjust the generally horizontal seating portion. As shown in FIG. 15 and in some embodiments, seat pan 1402 may be configured to rotate vertically to form an inclined seating surface. In some embodiments, leg rest 1404 may be rotatably coupled to seat pan 1402. In some embodiments, the seat pan and the leg rest may be configured to provide a continuous surface across the seat pan, the leg rest, and the generally horizontal bed portion. For example and as shown in FIG. 16A, seat pan 1402 and leg rest 1404 may be configured in a seating configuration. In some embodiments and as shown in FIG. 16B, seat pan 1402 and leg rest 1404 may be configured in a bed configuration. In some embodiments, both the seat pan 1402 and leg rest 1404 may be moved to close out a footwell. In this manner, seat pan 1402 and leg rest 1404 may be configured to provide a continuous surface across seat pan 1402 and leg rest 1404, and generally horizontal bed portion 510.

Figure 11:
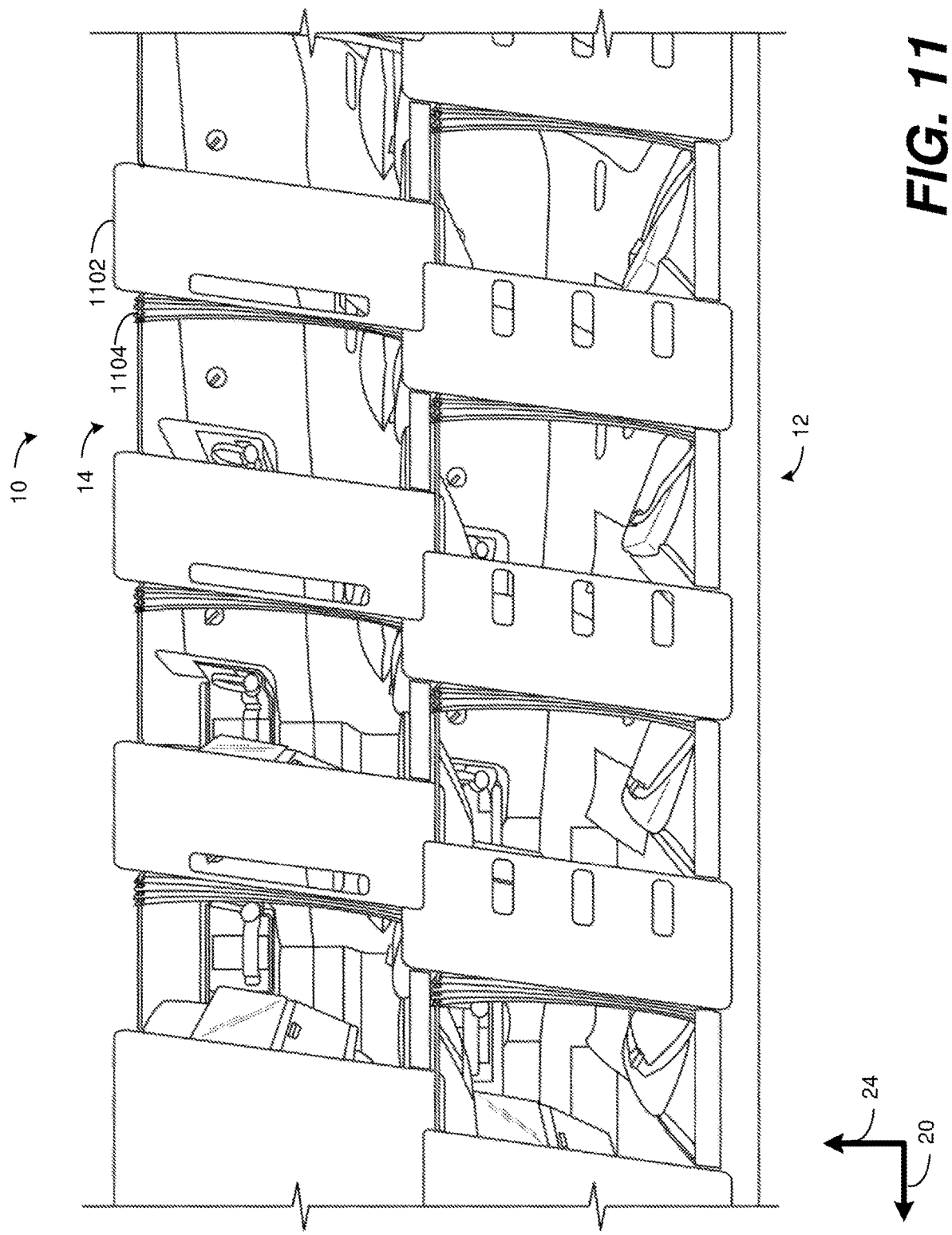
Figure 12:
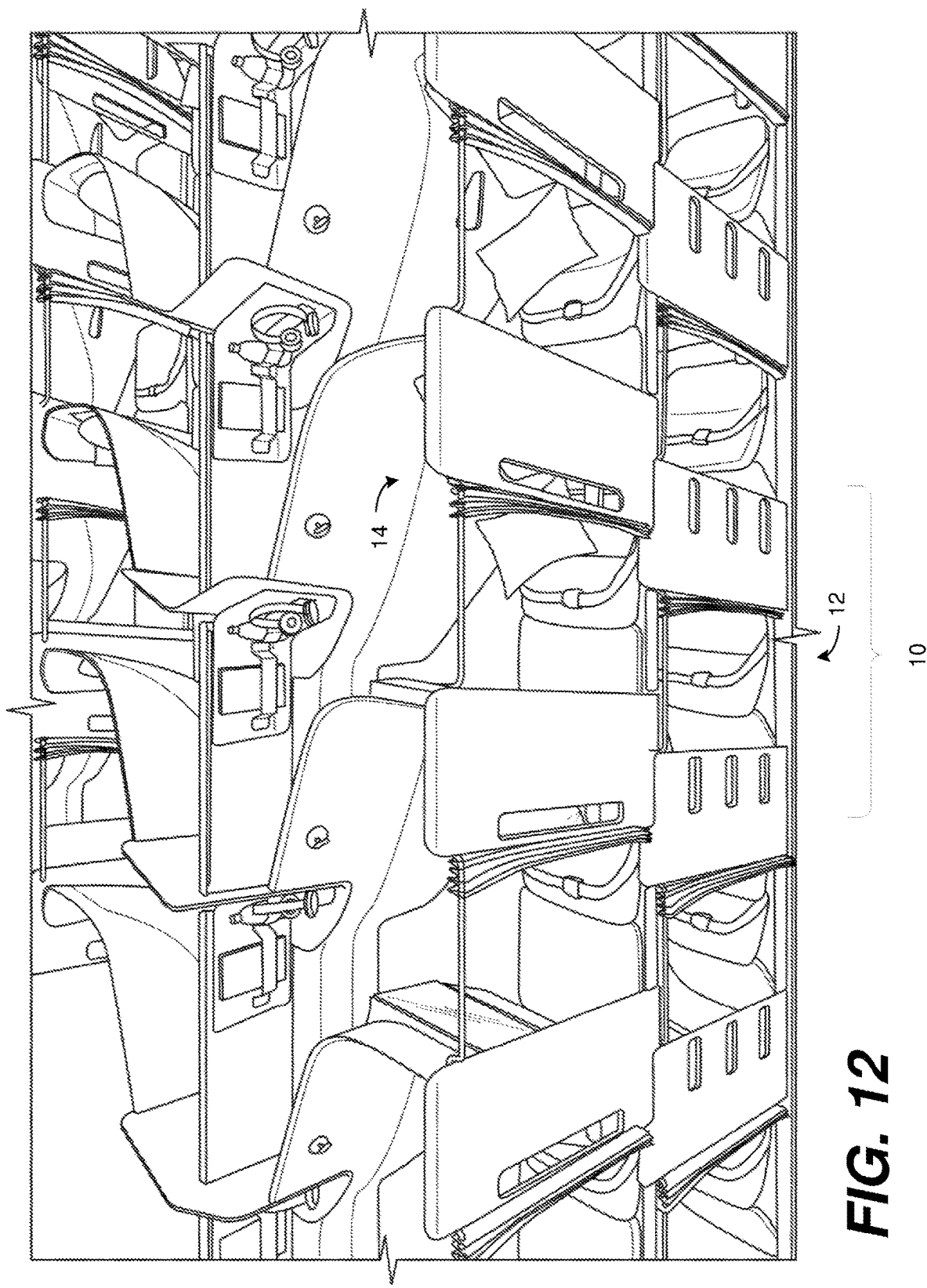
Figure 13:
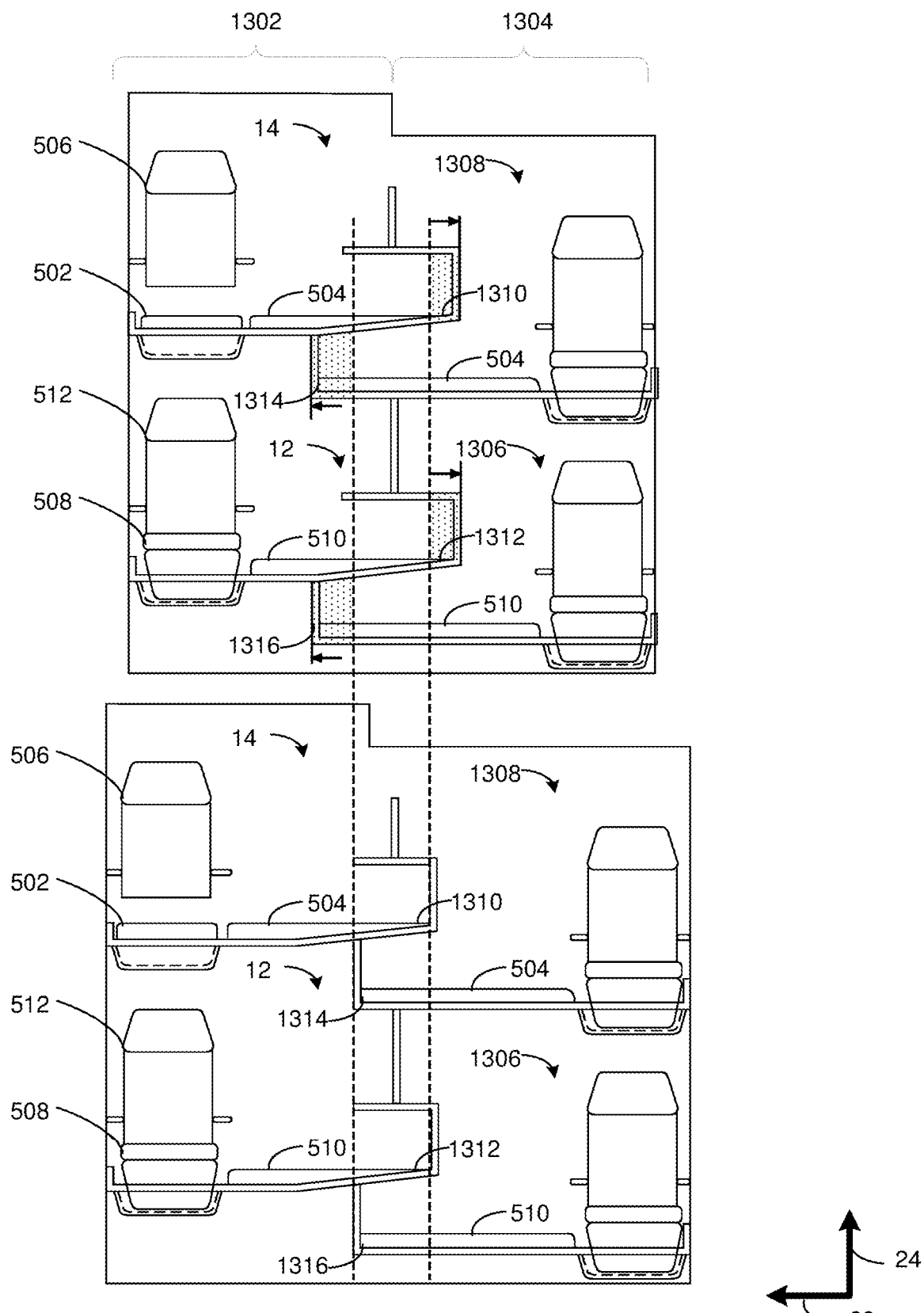
FIG. 13 includes multiple front views of a vehicular seating suite configuration, according to an example embodiment.
Figure 14:
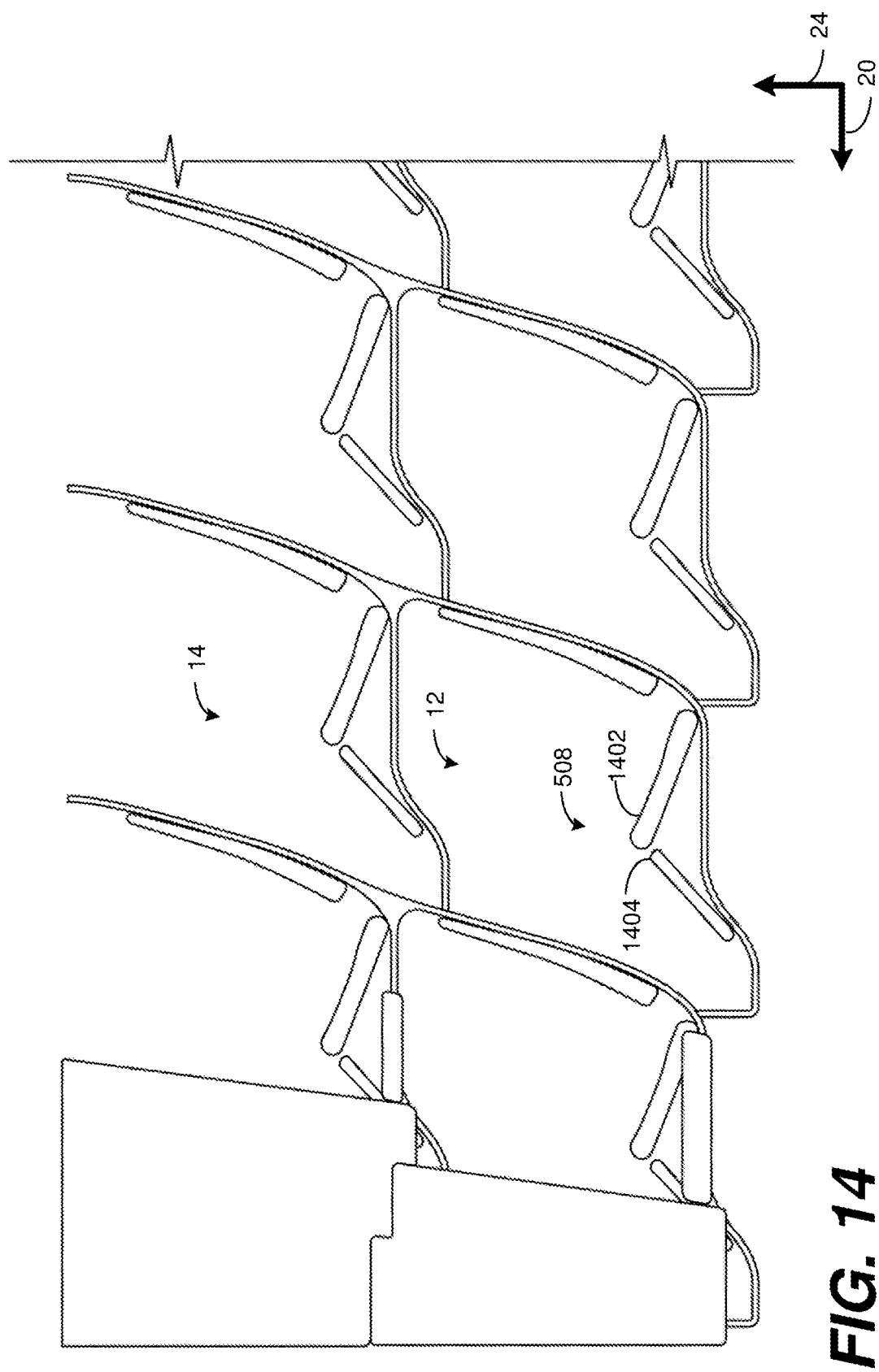
FIGS. 14-15 are side views of a vehicular seating suite configuration, according to an example embodiment.

Referring again to the example of FIG. 11 and in some embodiments, an upper seating suite may be horizontally offset from the lower seating suite along the longitudinal axis 20 of the vehicle. In this example, upper seating suite 14 may be horizontally offset or staggered from lower seating suite 12 along longitudinal axis 20 of the vehicle. In this example, the footwell of upper seating surface 14 extends down into the space of lower seating suite 12 without reducing the headroom of passenger in lower seating suite 12.

Figure 18:
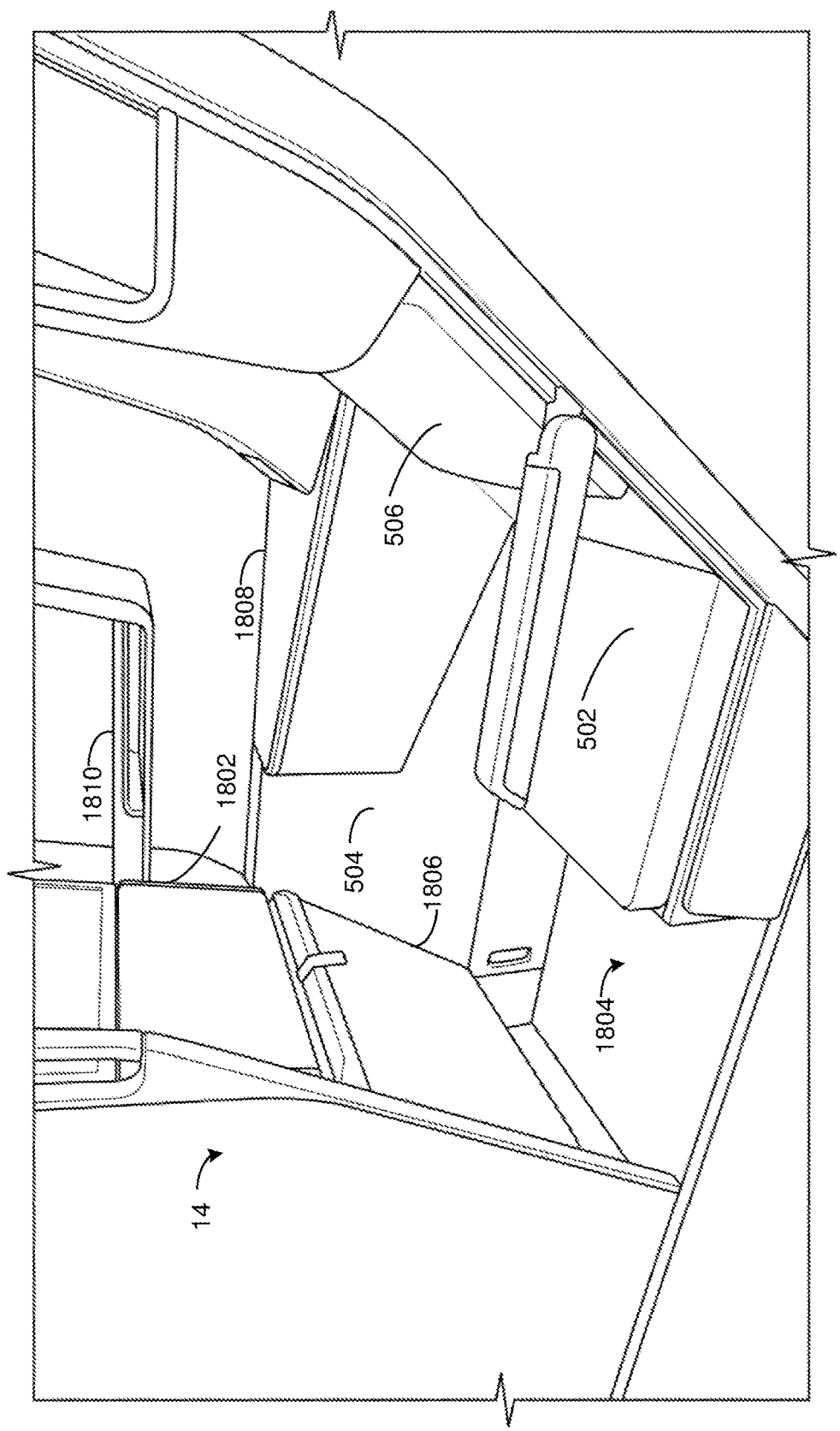
Figure 19:
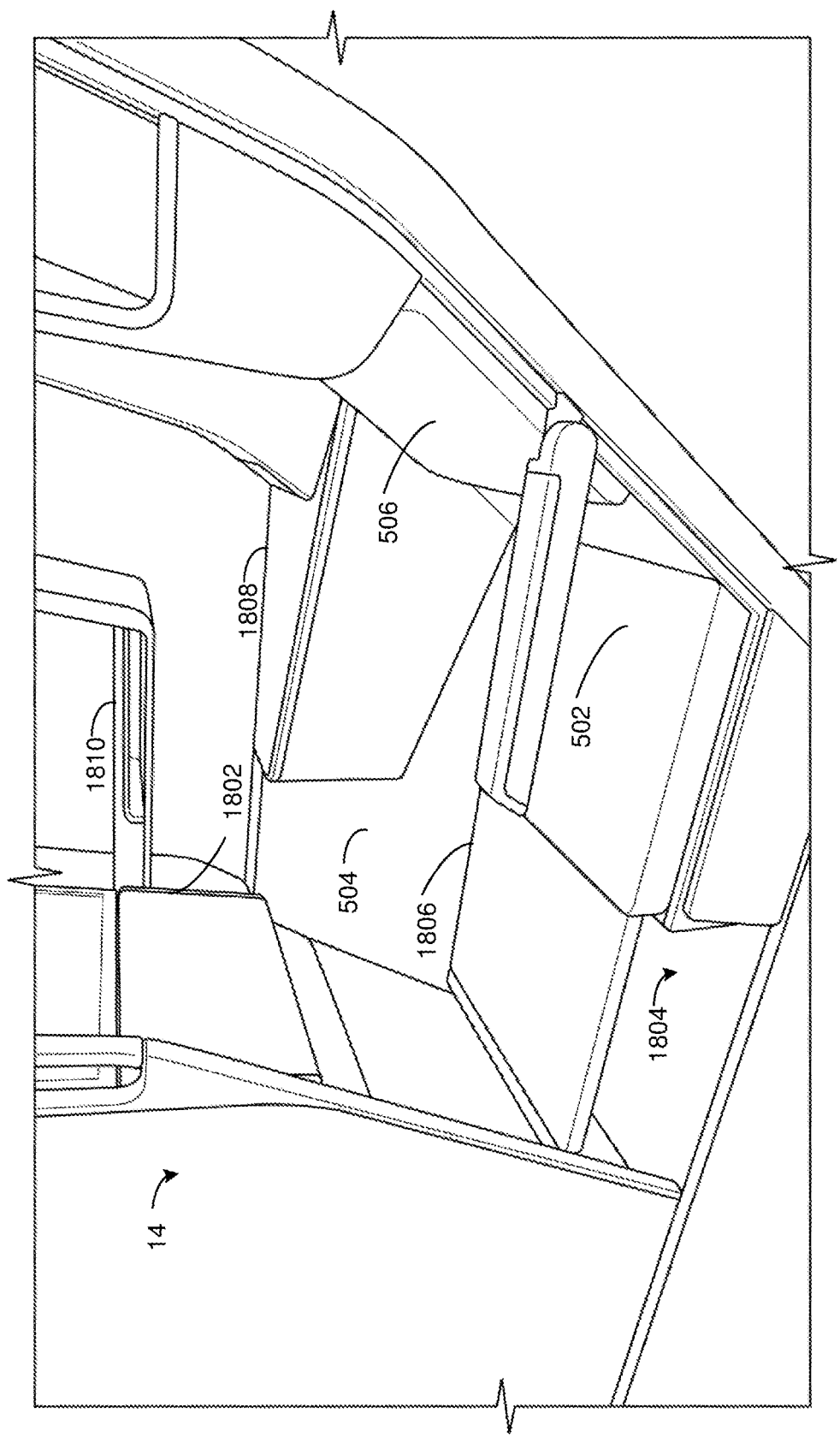
Figure 20:
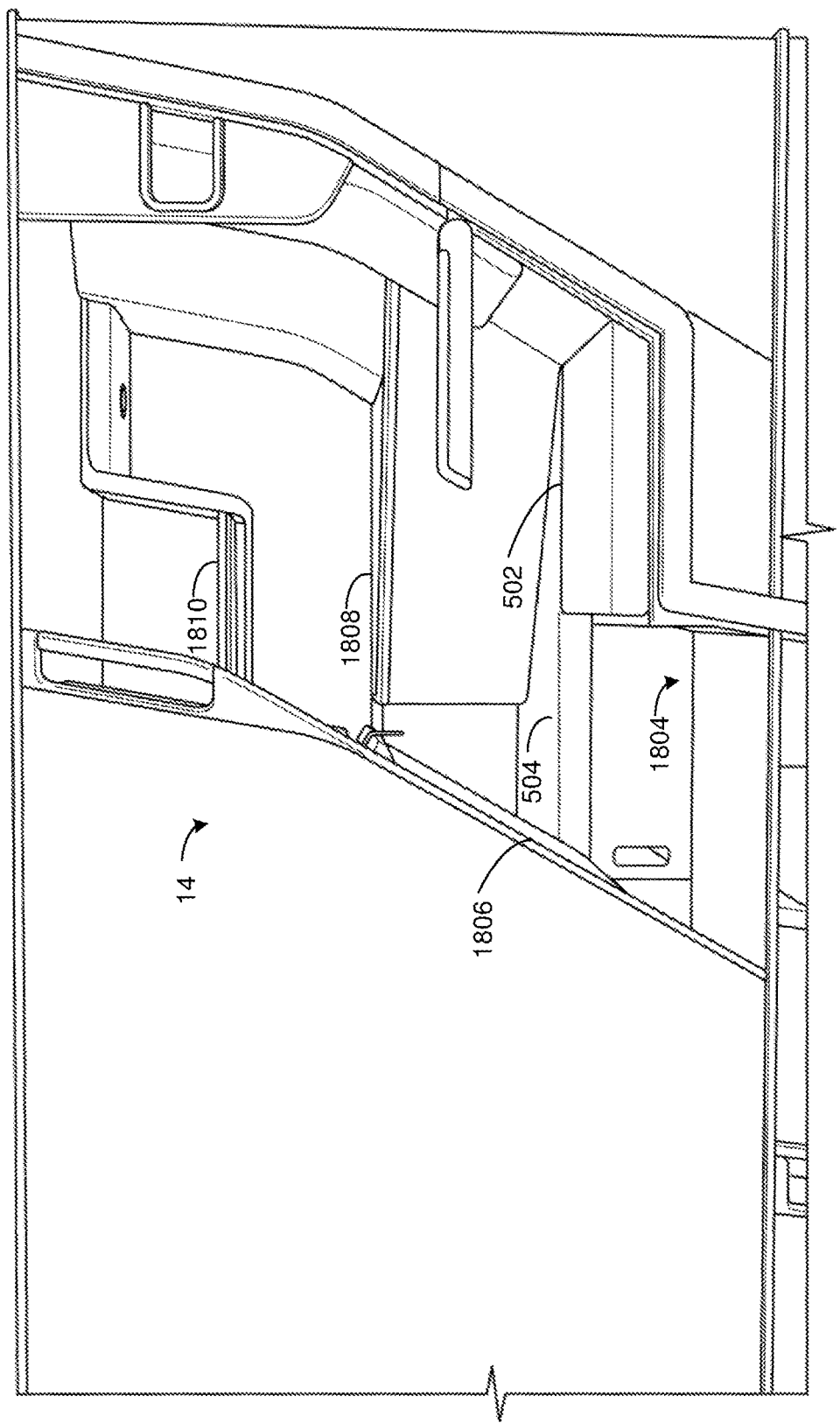
Figure 21:
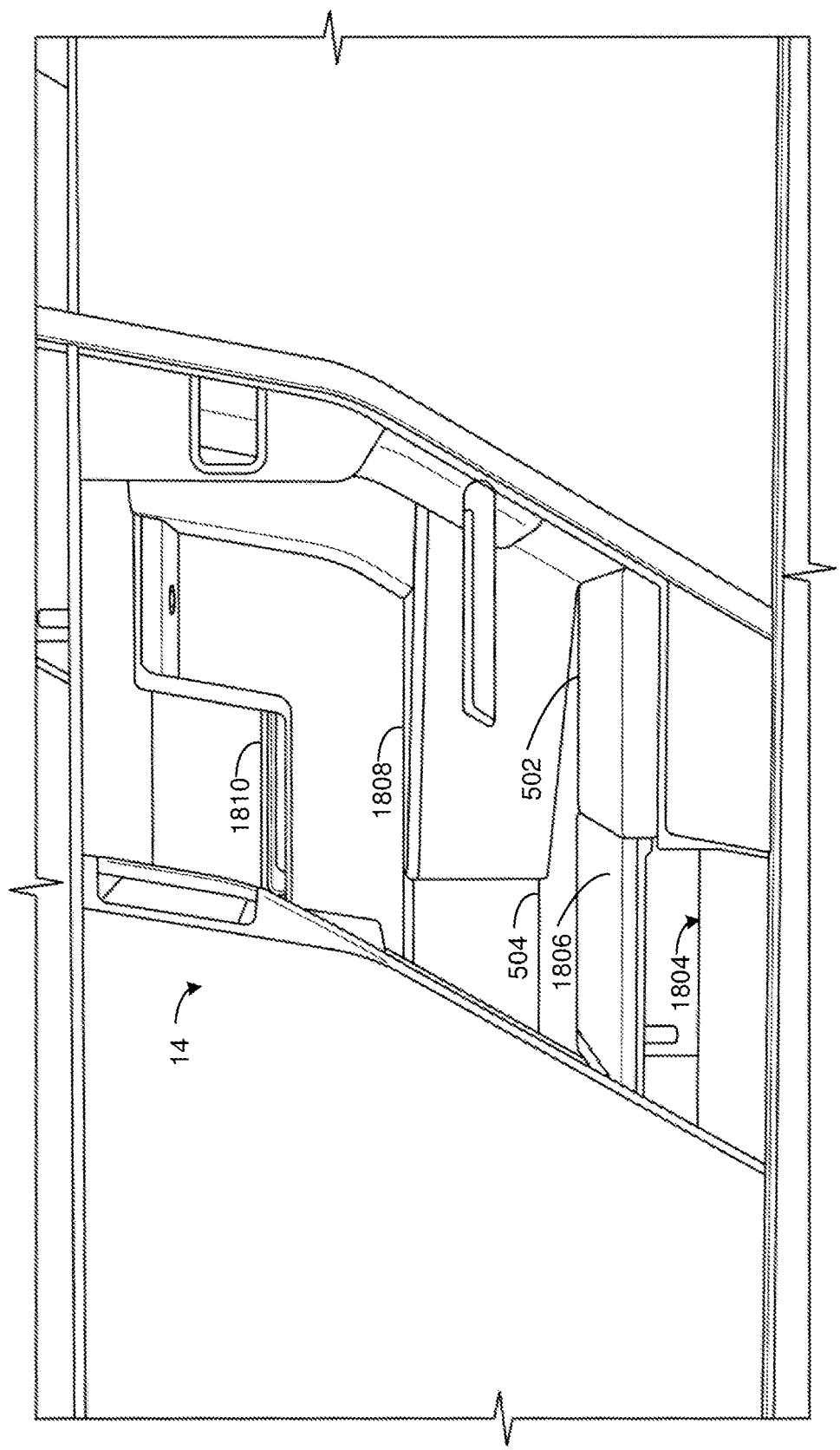
Figure 22:
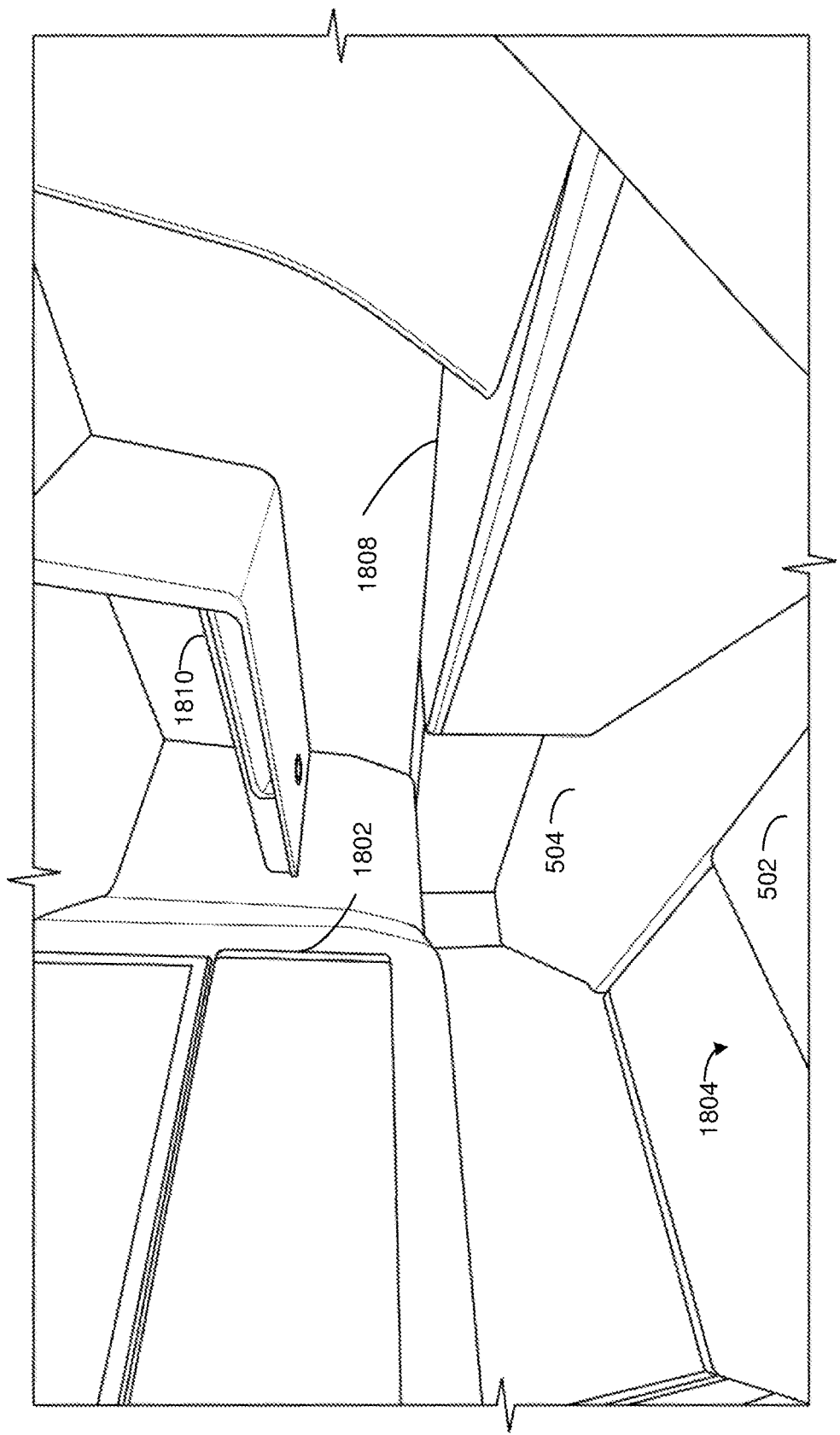
Figure 23:
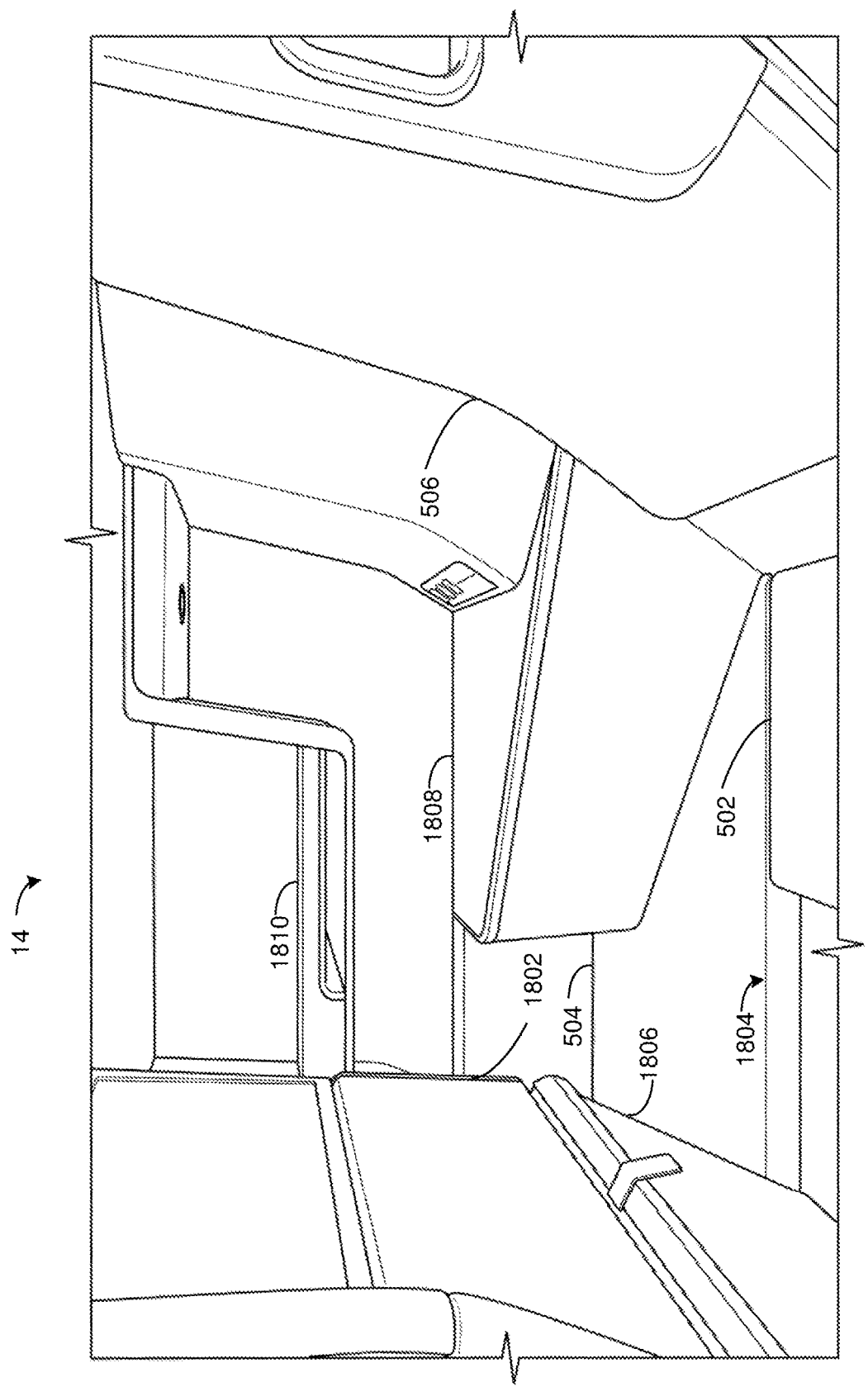
Figure 24:
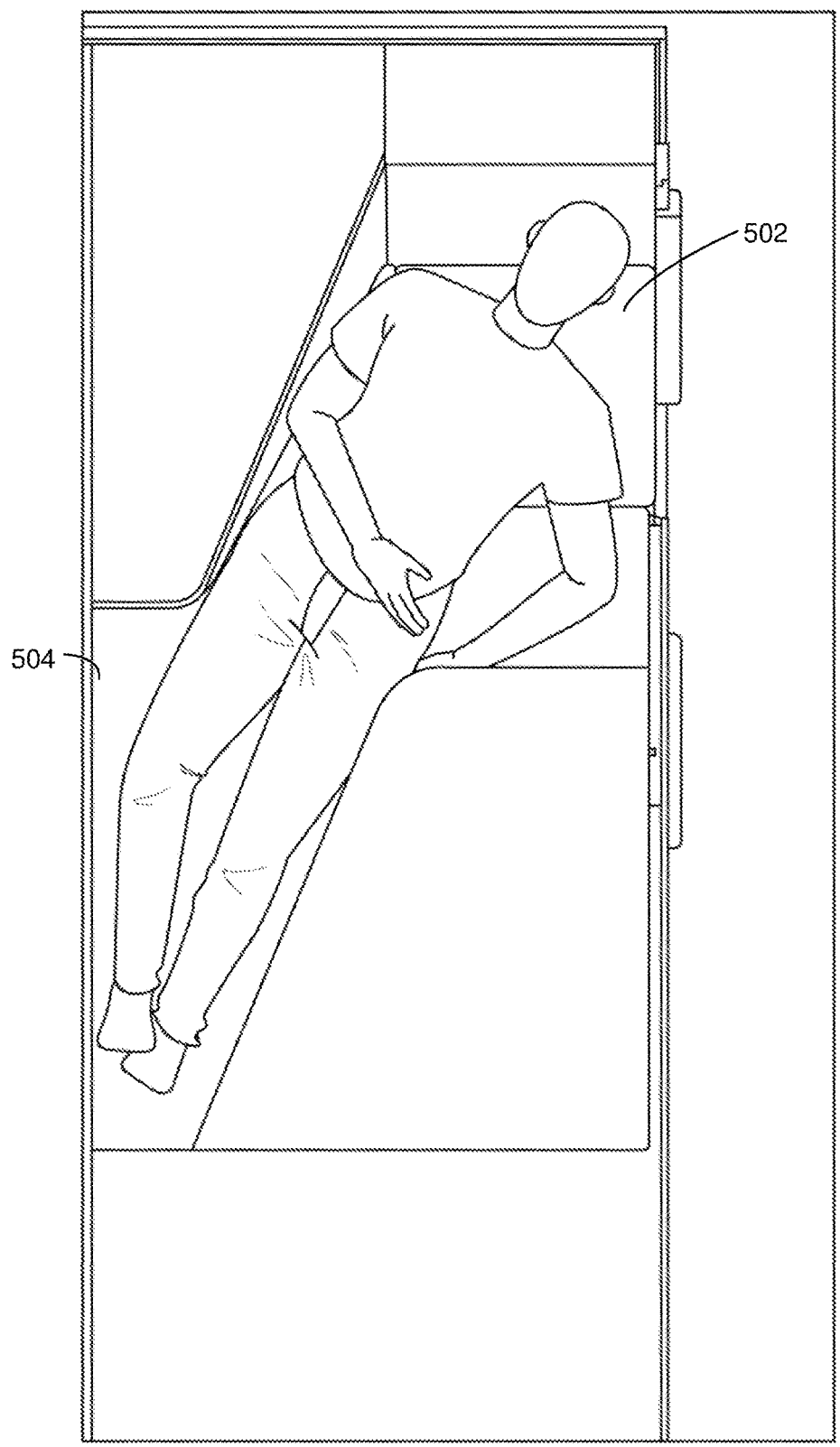
FIG. 24 is a top plan view of a vehicular seating suite configuration, according to an example embodiment.
Figure 26:
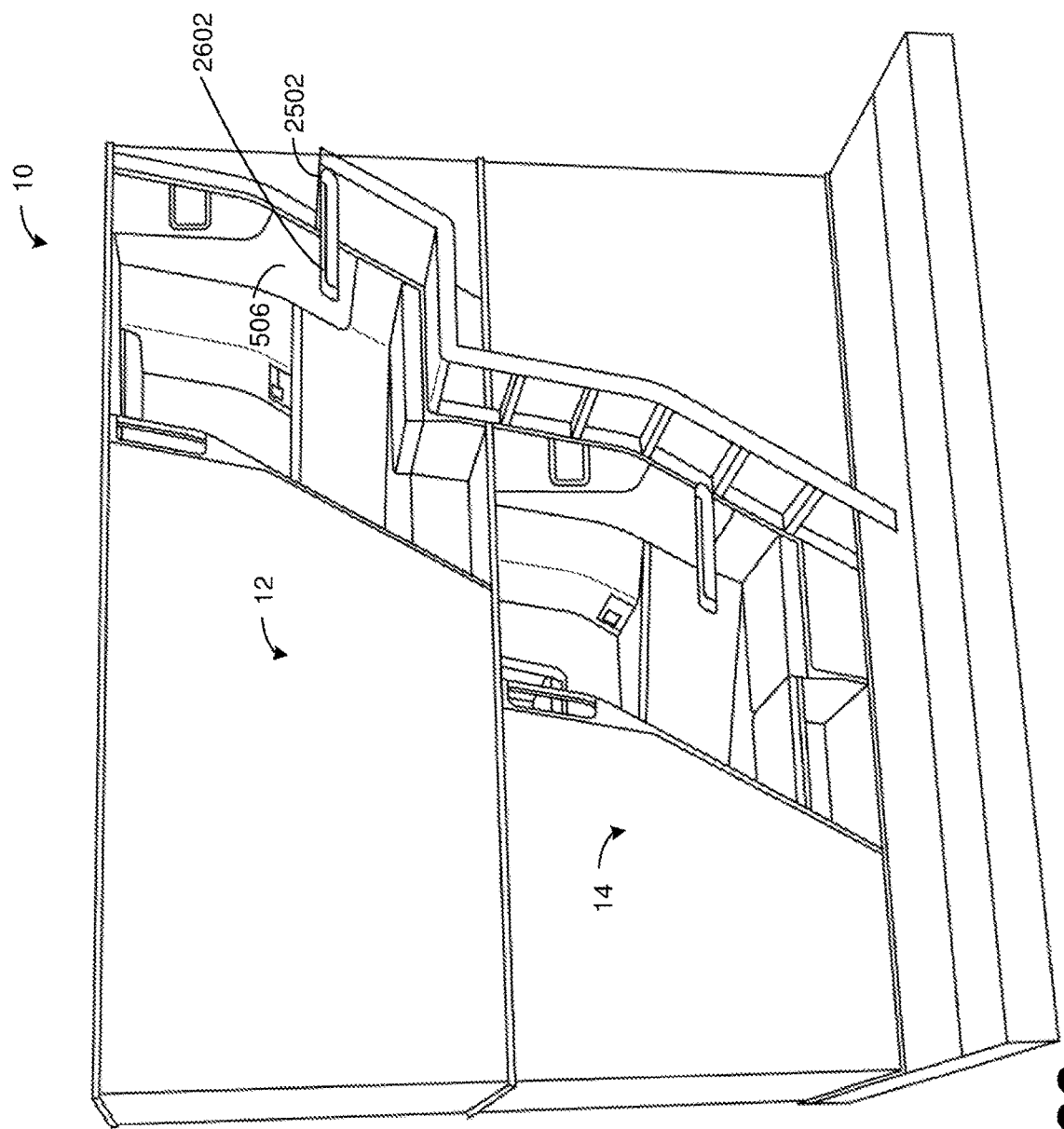
Figure 27:
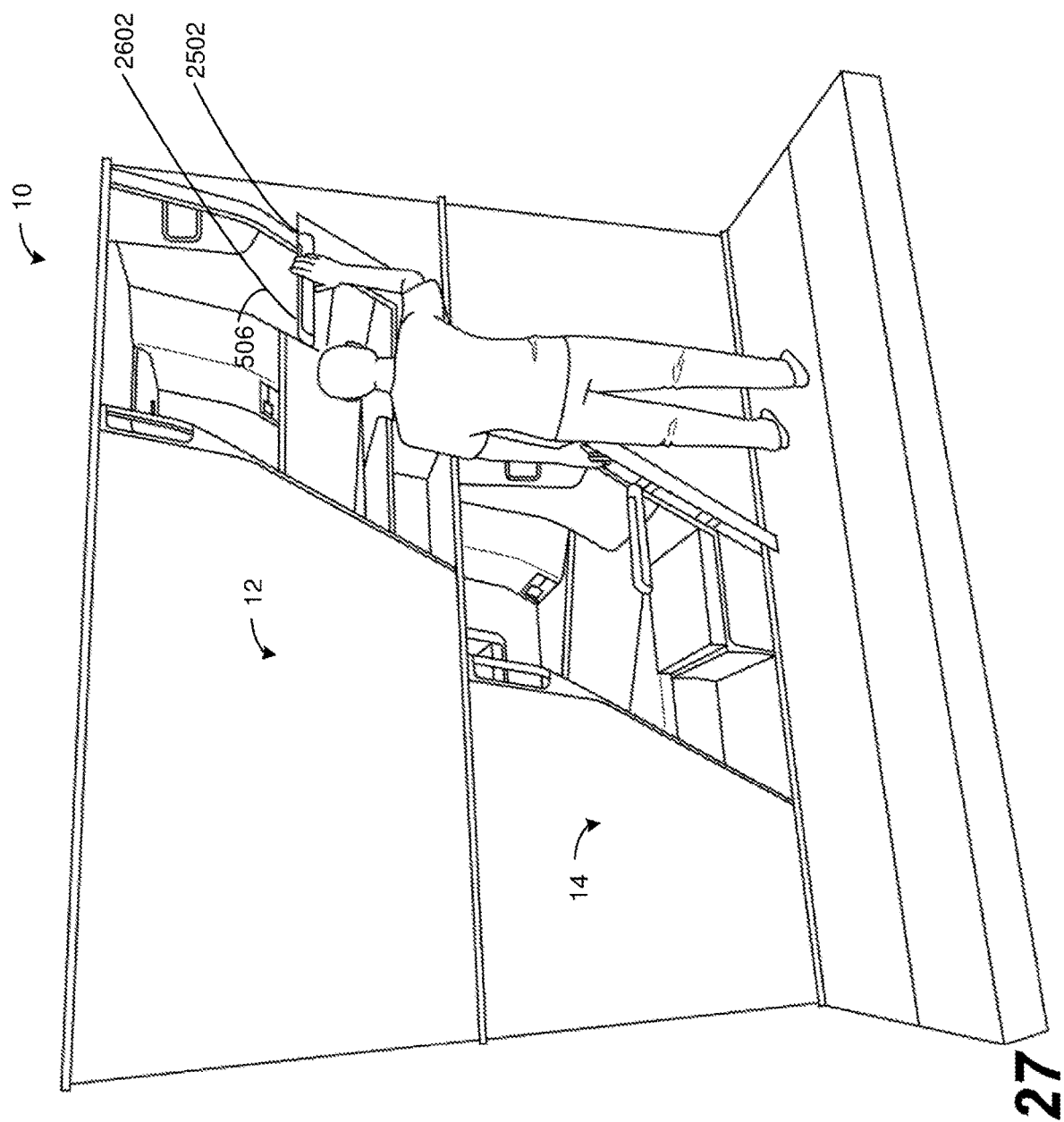
Figure 28:
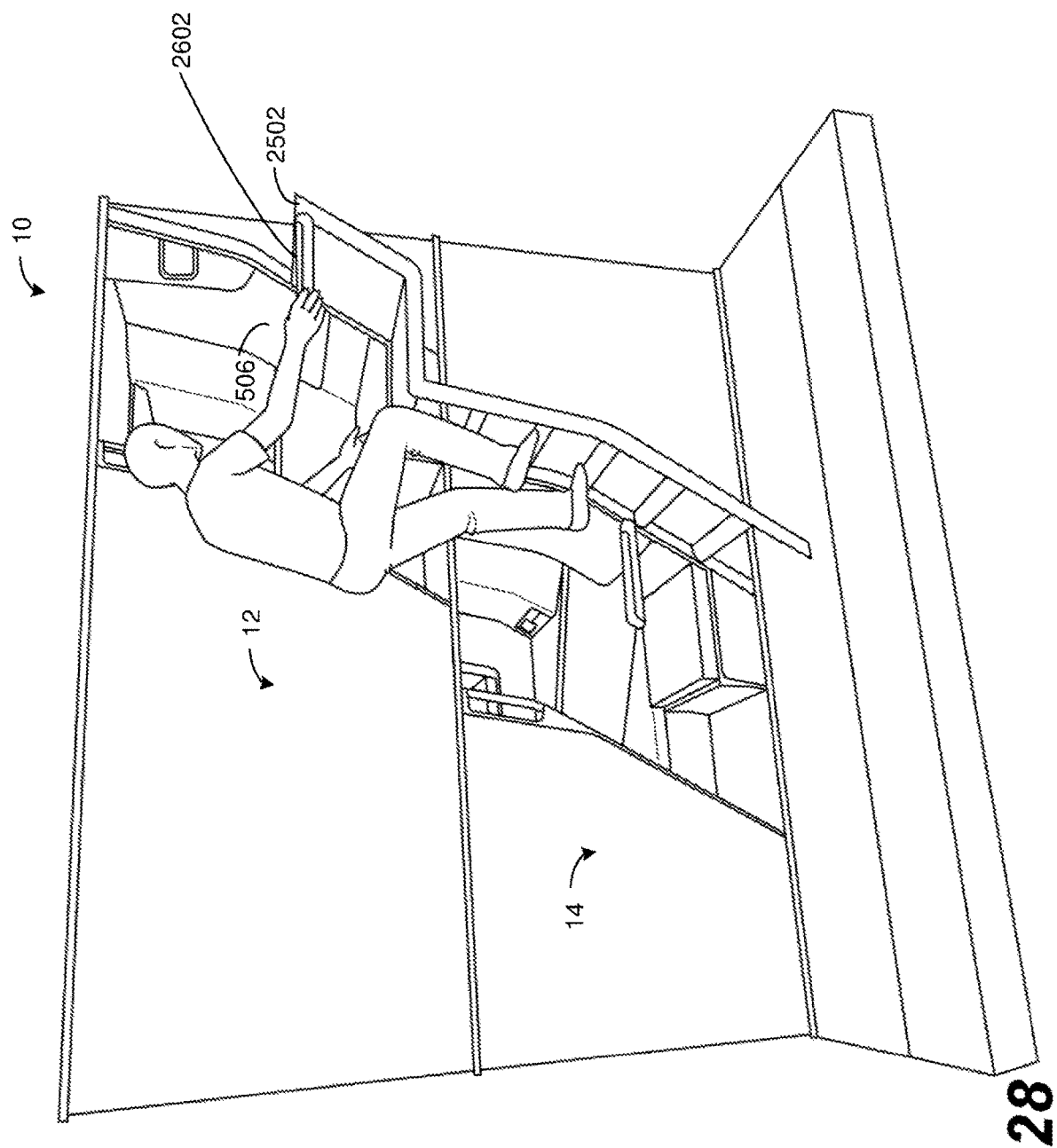
Figure 29:
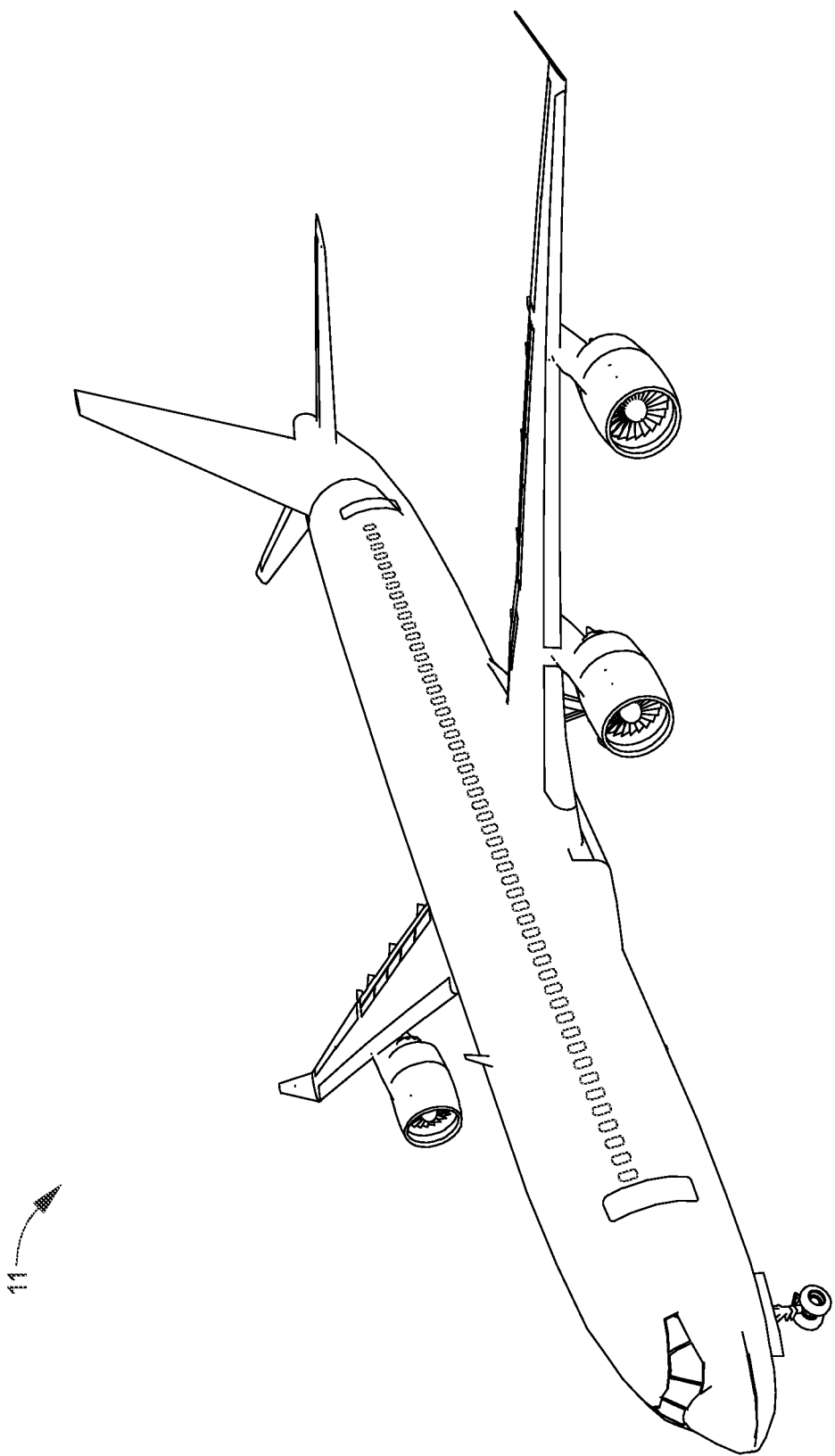
FIG. 29 is an exemplary embodiment of a vehicle 11 in the form of an aircraft, though one of ordinary skill in the art will appreciate that the vehicle could be a bus, a train, a boat, or a car as described herein.

In some embodiments, a seating suite may include a tray table disposed adjacent to the generally horizontal seating portion. For example, and as shown in FIG. 18, seating suite 14 may include tray table 1802 incorporated into the wall of seating suite 14. In some embodiments, tray table 1802 may be a bi-fold tray table. However, it will be appreciated that various configurations for the tray table are possible within the scope of the present disclosure.

In some embodiments, each seating suite may include a footwell adjacent to the generally horizontal seating portion and a removable footwell cover adjacent to the footwell. Referring also to the examples of FIGS. 18-19 and in some embodiments, seating suite 14 may include footwell 1804 adjacent to generally horizontal seating portion 502 and removable footwell cover 1806 adjacent to footwell 1804. In some embodiments, the removable footwell cover (e.g., removable footwell cover 1806) may be configured to provide a continuous surface from the generally horizontal seating portion (e.g., generally horizontal seating portion 502) and the generally horizontal bed portion (e.g., generally horizontal bed portion 504) across the footwell (e.g., footwell 1804).

As discussed above and in some embodiments, each seating suite may include a side console. In some embodiments, side console 1808 may be incorporated into an enclosure or wall of the seating suite (e.g., upper seating suite 14). In some embodiments, side console 1808 may include one or more lighting fixture(s). Referring also to the example of FIG. 18, seating suite 14 may include one or more storage compartments (e.g., storage compartment 1810) within the seating suite.

In some embodiments, the vehicular seating suite configuration may also include a telescopic ladder integrated into a lower seating suite and configured to provide access to an upper seating suite. Referring also to the example of FIGS. 25-28 and in some embodiments, telescopic ladder 2502 may be integrated into lower seating suite 12 and may be configured to retract into and telescope or extend out of lower seating suite 12. In this manner, ladder 2502 may provide access from the floor of a vehicle to upper seating suite 14. In some embodiments, telescopic ladder 2502 may be accessed by pulling on a handle or tab attached to telescopic ladder 2502. In some embodiments, ladder 2502 may automatically extend from and retract into lower seating suite 12 in response to selection of a push button or electronic user interface affixed to lower seating suite 12. In this manner, telescopic ladder 2502 may be accessed with little to no physical force by the passenger. While FIGS. 25-28 show telescopic ladder 2502 with five rungs, it will be appreciated that telescopic ladder 2502 may include any number of rungs or features for a passenger to hold or step on when using telescopic ladder 2502.

In some embodiments, the telescopic ladder may include a support mechanism that provides an armrest adjacent to the generally vertical backrest portion of the upper seating suite when the telescopic ladder is retracted into the lower seating suite. For example, support mechanism (e.g., support mechanism 2602) may provide an armrest adjacent to generally vertical backrest portion 506 when telescopic ladder 2502 is retracted into lower seating suite 12 (e.g., when a passenger is occupying upper seating suite 14). When telescopic ladder 2502 is extended out from lower seating suite 12 (e.g., when a passenger is using telescopic ladder 2502 to access upper seating suite 14), support mechanism 2602 may provide a handle or other graspable feature to help stabilize a passenger when using telescopic ladder 2502.

A number of implementations have been described. Nevertheless, it will be understood that various modifications may be made. Accordingly, other implementations are within the scope of the following claims.

What is claimed is:

1. A vehicular seating suite configuration comprising:
 a plurality of vertically stacked seating suites configured to be positioned within a vehicle, each seating suite comprising:
 a generally horizontal seating portion, and
 a generally horizontal bed portion adjacent to the generally horizontal seating portion,
 wherein a distal end of at least one generally horizontal bed portion of the plurality of seating suites of a first vehicular seating suite configuration is configured to at least partially overlap a distal end of at least one adjacent generally horizontal bed portion of a plurality of seating suites of a second vehicular seating suite configuration.

2. The vehicular seating suite configuration of claim 1, wherein the generally horizontal seating portion is aligned with a longitudinal axis of the vehicle and the generally horizontal bed portion is angled away from the longitudinal axis of the vehicle.

3. The vehicular seating suite configuration of claim 1, further comprising: a generally vertical backrest portion adjacent to a proximal end of the generally horizontal seating portion.

4. The vehicular seating suite configuration of claim 1, further comprising: a ladder disposed between a lower seating suite and an upper seating suite.

5. The vehicular seating suite configuration of claim 1, further comprising: at least one storage compartment disposed beneath at least a portion of a lower seating suite.

6. The vehicular seating suite configuration of claim 1, each seating suite further comprising: a tray table adjacent to the generally horizontal seating portion.

7. The vehicular seating suite configuration of claim 1, wherein each seating suite is at least partially enclosed.

8. The vehicular seating suite configuration of claim 1, each seating suite further comprising:
 a footwell adjacent to the generally horizontal seating portion, and
 a removable footwell cover adjacent to the footwell.

9. The vehicular seating suite configuration of claim 8, wherein the removable footwell cover is configured to provide a continuous surface from the generally horizontal seating portion and the generally horizontal bed portion across the footwell.

10. The vehicular seating suite configuration of claim 1, wherein the generally horizontal seating portion includes:
 a seat pan, and
 a leg rest coupled to the seat pan.

11. The vehicular seating suite configuration of claim 10, wherein the seat pan and leg rest are configured to provide a continuous surface across the seat pan, the leg rest, and the generally horizontal bed portion.

12. The vehicular seating suite configuration of claim 1, wherein an upper seating suite is horizontally offset from the lower seating suite along a longitudinal axis of the vehicle.

13. The vehicular seating suite configuration of claim 1, wherein the vehicular seating suite configuration is positioned within an aircraft.

14. A vehicular seating suite configuration comprising:
a plurality of vertically stacked seating suites configured to be positioned within a vehicle, each seating suite comprising:
an elongated generally horizontal seating surface; and
a generally vertical backrest portion adjacent to a proximal end of the elongated generally horizontal seating surface;
wherein the elongated generally horizontal seating surface and the generally vertical backrest portion are configured to accommodate a person in a sitting position;
wherein the elongated generally horizontal seating surface is configured to accommodate a person in a lying position; and
a ladder integrated into a lower seating suite and configured to provide access to an upper seating suite;
wherein the ladder includes a support mechanism that provides an armrest adjacent to the generally vertical backrest portion of the upper seating suite.

15. The vehicular seating suite configuration of claim 14, wherein the vehicular seating suite configuration is positioned within an aircraft.

* * * * *